United States Patent
Fukushima et al.

(10) Patent No.: US 10,852,679 B2
(45) Date of Patent: Dec. 1, 2020

(54) INFORMATION PROCESSING APPARATUS THAT INPUTS A SETTING RELATED TO A SENSITIVITY OF HUMAN SENSOR, CONTROL METHOD THEREOF, AND STORAGE MEDIUM

(71) Applicant: CANON KABUSHIKI KAISHA, Tokyo (JP)

(72) Inventors: Michio Fukushima, Yokohama (JP); Junnosuke Yokoyama, Toride (JP); Manabu Hada, Kawasaki (JP); Yusuke Horishita, Nagareyama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/547,832

(22) Filed: Aug. 22, 2019

(65) Prior Publication Data
US 2019/0377293 A1 Dec. 12, 2019

Related U.S. Application Data

(63) Continuation of application No. 15/650,349, filed on Jul. 14, 2017, now Pat. No. 10,444,685.

(30) Foreign Application Priority Data

Jul. 29, 2016 (JP) .................. 2016-150552

(51) Int. Cl.
*G03G 15/00* (2006.01)
*G06K 9/00* (2006.01)
*H04N 1/00* (2006.01)

(52) U.S. Cl.
CPC ..... *G03G 15/5004* (2013.01); *G03G 15/5016* (2013.01); *G03G 15/5091* (2013.01);
(Continued)

(58) Field of Classification Search
None
See application file for complete search history.

(56) References Cited

U.S. PATENT DOCUMENTS

| 8,823,967 B2 | 9/2014 | Mamiya et al. |
| 9,065,952 B2 | 6/2015 | Mamiya et al. |

(Continued)

FOREIGN PATENT DOCUMENTS

| JP | 2012-114499 A | 6/2012 |
| JP | 2015-000501 A | 1/2015 |

(Continued)

OTHER PUBLICATIONS

Japanese Office Action dated Mar. 27, 2020 in corresponding Japanese patent application No. 2016150552.
(Continued)

*Primary Examiner* — Victor Verbitsky
(74) *Attorney, Agent, or Firm* — Venable LLP

(57) ABSTRACT

An image forming apparatus measures the distance between the image forming apparatus and an object located in the periphery of the image forming apparatus each predetermined amount of time. Then, whether or not the object is a human is detected on the basis of the measured distance and a moving amount of the object each predetermined amount of time. Furthermore, the image forming apparatus controls the power supply state of the image forming apparatus in accordance with the result of the human detection.

10 Claims, 20 Drawing Sheets

(52) U.S. Cl.
CPC ..... *G06K 9/00362* (2013.01); *G06K 9/00771* (2013.01); *H04N 1/00323* (2013.01); *H04N 1/00381* (2013.01); *H04N 1/00896* (2013.01); *H04N 2201/0094* (2013.01)

(56) References Cited

U.S. PATENT DOCUMENTS

| | | | |
|---|---|---|---|
| 9,294,644 | B2 | 3/2016 | Mamiya et al. |
| 9,505,250 | B2 | 11/2016 | Arai et al. |
| 10,037,591 | B2 | 7/2018 | Ichikawa et al. |
| 10,038,816 | B2 | 7/2018 | Yokoyama |
| 10,171,689 | B2 | 1/2019 | Arai et al. |
| 10,444,685 | B2 | 10/2019 | Fukushima et al. |
| 2002/0089694 | A1* | 7/2002 | Idehara ............... H04N 1/00 358/1.15 |
| 2005/0120211 | A1 | 6/2005 | Yokoyama |
| 2011/0316840 | A1 | 12/2011 | Hirata et al. |
| 2012/0127538 | A1 | 5/2012 | Mamiya et al. |
| 2013/0073887 | A1 | 3/2013 | Miki et al. |
| 2014/0333949 | A1 | 11/2014 | Mamiya et al. |
| 2015/0002877 | A1 | 1/2015 | Ono et al. |
| 2015/0256699 | A1 | 9/2015 | Mamiya et al. |
| 2017/0351423 | A1 | 12/2017 | Yokoyama |

FOREIGN PATENT DOCUMENTS

| | | |
|---|---|---|
| JP | 2016-034735 A | 3/2016 |
| JP | 2016-055550 A | 4/2016 |

OTHER PUBLICATIONS

Japanese Office Action dated Aug. 24, 2020 in corresponding Japanese patent application No. 2016150552.

\* cited by examiner

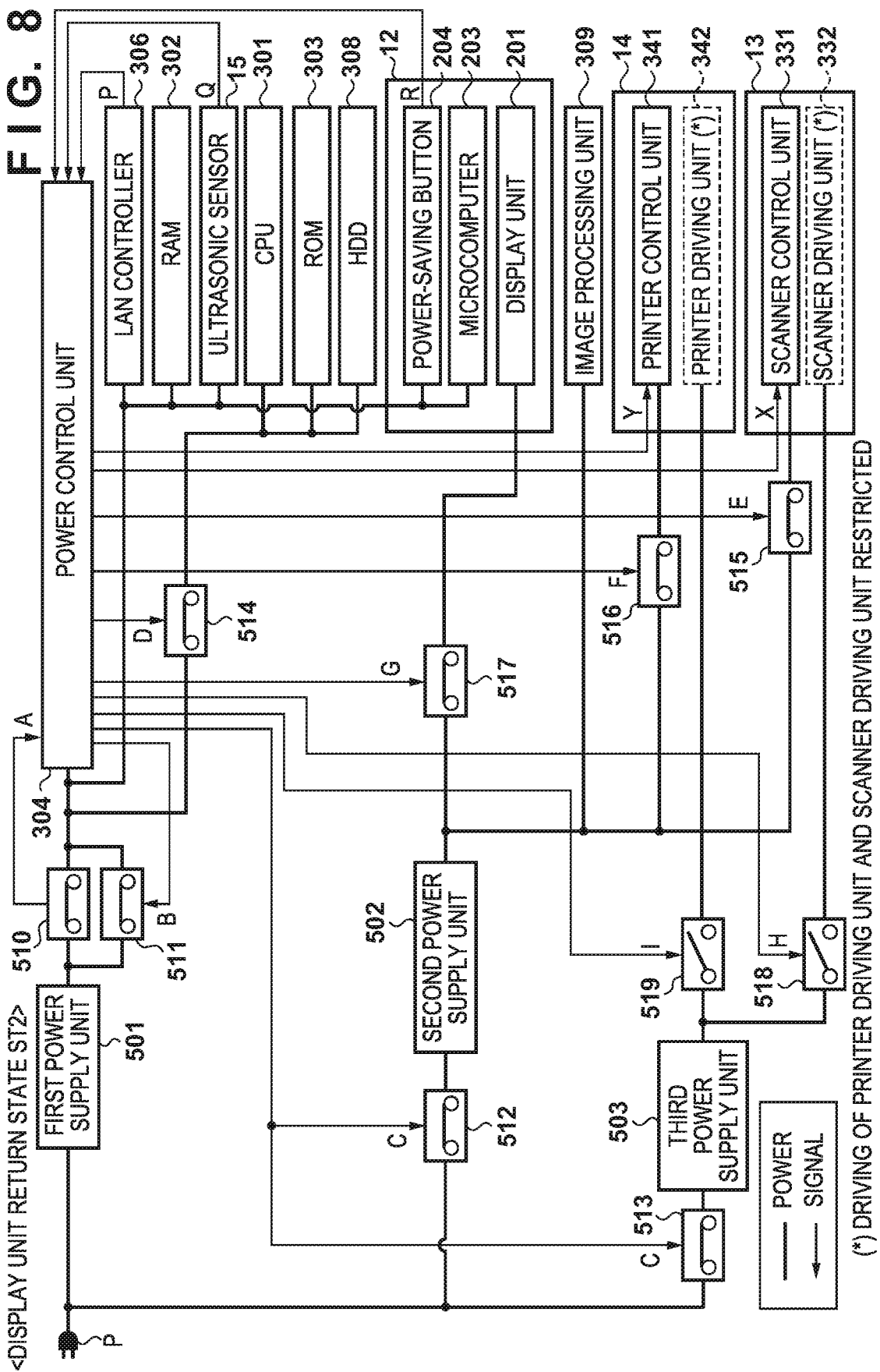

FIG. 13

| DISTANCE[cm] | MOVING AMOUNT DETERMINATION VALUE |
|---|---|
| 0~60 | 0cm |
| 61~100 | 5cm |
| 101~140 | 10cm |
| 141~180 | 20cm |
| 181 cm OR MORE | ∞ cm |

| DISTANCE (cm) | MOVING AMOUNT DETERMINATION VALUE | | |
|---|---|---|---|
| | LOW SENSITIVITY | MEDIUM SENSITIVITY | HIGH SENSITIVITY |
| 0~60 | 0cm | 0cm | 0cm |
| 61~100 | 5cm | 3cm | 2cm |
| 101~140 | ∞ cm | 8cm | 6cm |
| 141~180 | ∞ cm | ∞ cm | 10cm |
| HUMAN DETECTION COUNT M | 8 | 5 | 2 |
| OPERATOR DETECTION COUNT N | 15 | 8 | 2 |

INFORMATION PROCESSING APPARATUS THAT INPUTS A SETTING RELATED TO A SENSITIVITY OF HUMAN SENSOR, CONTROL METHOD THEREOF, AND STORAGE MEDIUM

CROSS-REFERENCE TO RELATED APPLICATIONS

The present application is a Continuation of U.S. patent application Ser. No. 15/650,349, filed Jul. 14, 2017, which claims priority to Japanese Patent Application No. 2016-150552, filed Jul. 29, 2016, the entire disclosures of which are hereby incorporated by reference herein.

BACKGROUND OF THE INVENTION

Field of the Invention

The present invention relates to an information processing apparatus including a sensor that detects an approaching human, a control method thereof, and a storage medium.

Description of the Related Art

Image forming apparatuses including human detecting sensors that detect a human approaching the image forming apparatus (a user) are known. For example, Japanese Patent Laid-Open No. 2012-114499 proposes a technique in which a sensor provided in an image forming apparatus detects a human approaching the image forming apparatus. It is then determined that the human has stopped in front of the image forming apparatus, and the image forming apparatus is returned from a power-saving state. According to this image forming apparatus, it is determined that the human has stopped in front of the image forming apparatus, and the image forming apparatus is returned from the power-saving state, in the case where the human can no longer be detected by a pyroelectric sensor capable of detecting human movement.

However, this conventional technique poses the following problem. According to the conventional technique, the image forming apparatus is returned from the power-saving state upon it being determined that an operator of the image forming apparatus has stopped in front of the apparatus. As such, it is necessary for the operator in front of the apparatus to wait in front of the apparatus until the image forming apparatus is returned from the power-saving state. However, it is also necessary to consider erroneous detections made by human detecting sensors. For example, increasing the sensitivity of a human detecting sensor increases the likelihood of erroneous returns caused by erroneous detections, whereas reducing the sensitivity of the human detecting sensor makes it difficult to detect a human.

SUMMARY OF THE INVENTION

The present invention enables realization of a system that reduces erroneous returns from a power-saving state caused by erroneous detections of humans by changing a condition for detecting that a human is approaching an apparatus depending on a distance between the human and the apparatus.

One aspect of the present invention provides an information processing apparatus having a plurality of power states including at least a first power state in which a supply of power to a device is stopped and a second power state in which power is supplied to the device, the apparatus comprising: a human detecting sensor; a setting unit configured to set a sensitivity of the human detecting sensor; and a control unit configured to: cause the information processing apparatus to transition from the first power state to the second power state in the case where a first sensitivity has been set by the setting unit and it has been determined that a human is in a predetermined area on the basis of a detection result from the human detecting sensor; cause the information processing apparatus to transition from the first power state to the second power state in the case where a second sensitivity has been set by the setting unit and it has been determined that a human is in the predetermined area on the basis of a detection result from the human detecting sensor; and cause the information processing apparatus to transition from the first power state to the second power state in the case where the second sensitivity has been set by the setting unit and it has been determined, on the basis of the detection result from the human detecting sensor, that a human in an area outside the predetermined area has approached the information processing apparatus by greater than or equal to a predetermined moving amount in a predetermined amount of time.

Another aspect of the present invention provides a control method of an information processing apparatus having a plurality of power states, including at least a first power state in which a supply of power to a device is stopped and a second power state in which power is supplied to the device, and including a human detecting sensor, the method comprising: setting a sensitivity of the human detecting sensor; and carrying out control such that: the information processing apparatus transitions from the first power state to the second power state in the case where a first sensitivity has been set in the step of setting and it has been determined that a human is in a predetermined area on the basis of a detection result from the human detecting sensor; the information processing apparatus transitions from the first power state to the second power state in the case where a second sensitivity has been set in the step of setting and it has been determined that a human is in the predetermined area on the basis of a detection result from the human detecting sensor; and the information processing apparatus transitions from the first power state to the second power state in the case where the second sensitivity has been set in the step of setting and it has been determined, on the basis of the detection result from the human detecting sensor, that a human in an area outside the predetermined area has approached the information processing apparatus by greater than or equal to a predetermined moving amount in a predetermined amount of time.

Still another aspect of the present invention provides a non-transitory computer-readable storage medium storing a computer program that causes a computer to execute a control method of an information processing apparatus having a plurality of power states, including at least a first power state in which a supply of power to a device is stopped and a second power state in which power is supplied to the device, and including a human detecting sensor, the method comprising: setting a sensitivity of the human detecting sensor; and carrying out control such that: the information processing apparatus transitions from the first power state to the second power state in the case where a first sensitivity has been set in the step of setting and it has been determined that a human is in a predetermined area on the basis of a detection result from the human detecting sensor; the information processing apparatus transitions from the first power state to the second power state in the case where a second sensitivity has been set in the step of setting and it has been determined that a human is in the predetermined area on the basis of a detection result from the human detecting sensor; and the information processing apparatus transitions from the first power state to the second power state in the case where the second sensitivity has been set in the step of setting and it has been determined, on the basis of the detection result from the human detecting sensor, that a human in an area outside the predetermined area has approached the information processing apparatus by greater than or equal to a predetermined moving amount in a predetermined amount of time.

Further features of the present invention will be apparent from the following description of an exemplary embodiment with reference to the attached drawings.

BRIEF DESCRIPTION OF THE DRAWINGS

FIG. 8 is a diagram illustrating the image forming apparatus in a display unit return state according to an embodiment.

FIG. 13 is a diagram illustrating moving amount determination values set in accordance with detected distances according to an embodiment.

DESCRIPTION OF THE EMBODIMENTS

Embodiments of the present invention will now be described in detail with reference to the drawings. It should be noted that the relative arrangement of the components, the numerical expressions, and numerical values set forth in the embodiments do not limit the scope of the present invention unless it is specifically stated otherwise.

First Embodiment

Configuration of Information Processing Apparatus

Figure 1A:
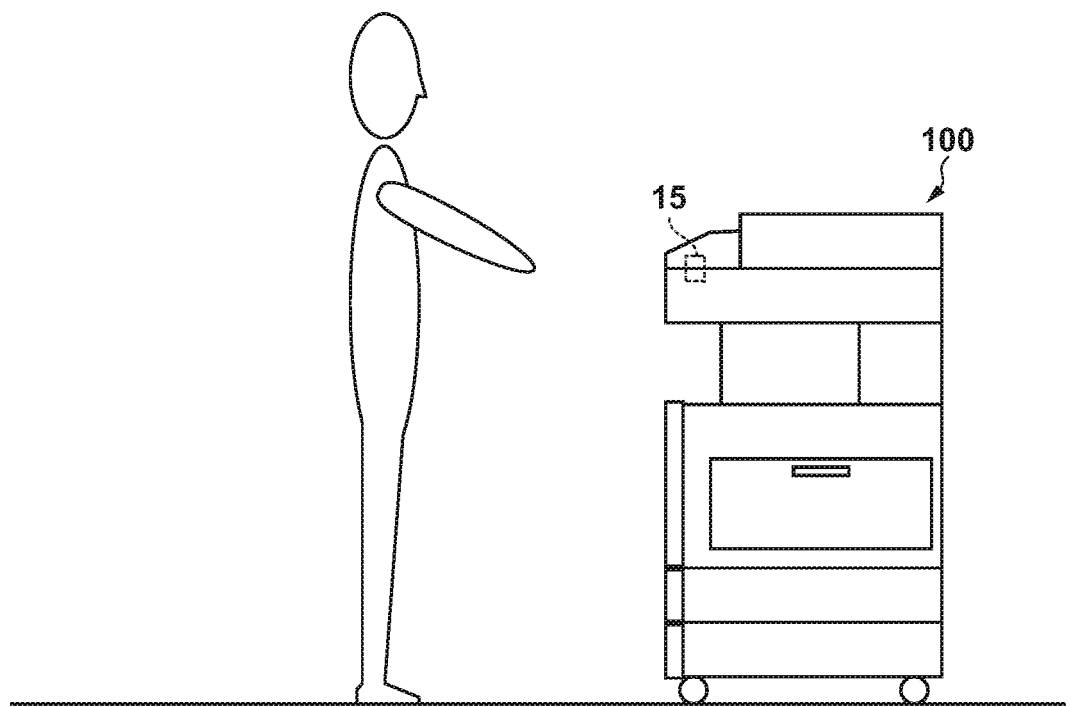
FIGS. 1A and 1B are external views of an image forming apparatus according to an embodiment.
Figure 1B:
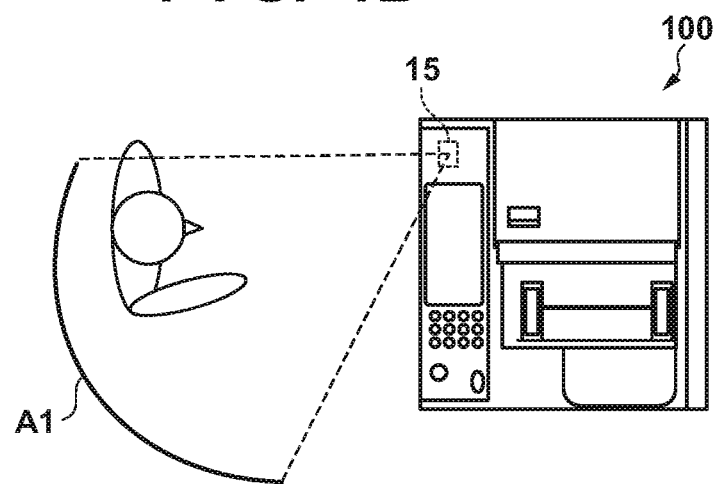

Hereinafter, a first embodiment of the present invention will be described. First, the configuration of an information processing apparatus according to the present embodiment will be described with reference to FIGS. 1A and 1B. In the present embodiment, an image forming apparatus will be described as an example of the information processing apparatus. FIG. 1A is a side view of an image forming apparatus 100, and FIG. 1B is a bird's-eye view of the image forming apparatus 100. The image forming apparatus 100 is a multifunction peripheral (MFP) having multiple functions such as a printing function, a scanner function, a copy function, and a fax function.

The image forming apparatus 100 includes an ultrasonic sensor 15 for detecting a human approaching the image forming apparatus 100. In the case where the ultrasonic sensor 15 has detected a human approaching the image forming apparatus 100, the image forming apparatus 100 returns from a power-saving state, in which a low amount of power is consumed, to a standby state, in which any of the aforementioned functions can be used.

The ultrasonic sensor 15 outputs an inaudible 40 KHz pulse wave and receives a reflected wave from that pulse wave, reflected by an object located in the periphery of the image forming apparatus 100. The ultrasonic sensor 15 can measure a distance between the image forming apparatus 100 and the object on the basis of the time from when the pulse wave is output to when the reflected wave is received. The measurement is carried out every predetermined amount of time, and a transition in the distance between the image forming apparatus 100 and the object can be confirmed every amount of time. Although an example in which the ultrasonic sensor 15 is used is described here, the present invention is not limited thereto. Any sensor capable of detecting a human may be used. For example, an infrared light-receiving sensor that receives infrared light radiated from a human may be used. Alternatively, an electrostatic capacitance sensor that measures a distance between the sensor and a target object on the basis of electrostatic capacitance between the sensor and the target object may be used. Furthermore, an infrared array sensor in which infrared light-receiving units are arranged in a line or in a matrix may be used.

Meanwhile, as illustrated in FIG. 1B, the ultrasonic sensor 15 has a fan-shaped detection area A1. Note that the ultrasonic sensor 15 may be arranged such that the pulse waves are output in the upward direction in order to detect humans without being affected by obstacles such as computers placed on desks.

Hardware Configuration

Figure 2:
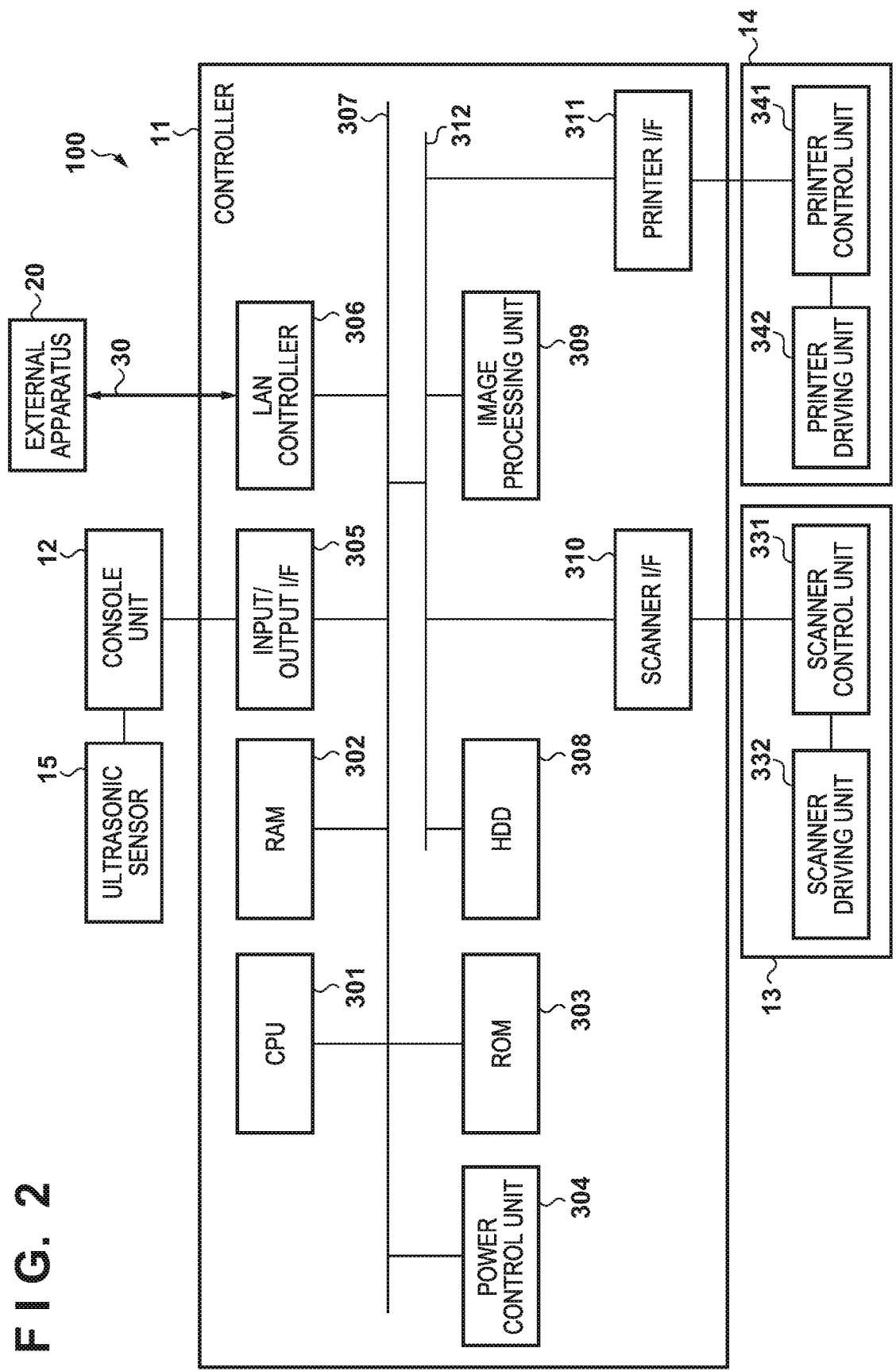
FIG. 2 is a block diagram illustrating the hardware of the image forming apparatus according to an embodiment.

Next, the hardware configuration of the image forming apparatus 100 will be described with reference to FIG. 2. As illustrated in FIG. 2, the image forming apparatus 100 includes a controller 11 that controls the operations of the image forming apparatus 100 as a whole, a console unit 12, a scanner unit 13, a printer unit 14, and the ultrasonic sensor 15.

The controller 11 is communicatively connected to the console unit 12, the scanner unit 13, and the printer unit 14. The controller 11 includes a CPU 301, RAM 302, ROM 303, a power control unit 304, an input/output I/F 305, and a LAN controller 306. The CPU 301, the RAM 302, the ROM 303, the power control unit 304, the input/output I/F 305, and the LAN controller 306 are connected to a system bus 307. The controller 11 also includes an HDD 308, an image processing unit 309, a scanner I/F 310, and a printer I/F 311. The HDD 308, the image processing unit 309, the scanner I/F 310, and the printer I/F 311 are connected to an image bus 312.

The CPU 301 carries out the overall control of access with various connected devices on the basis of control programs and the like stored in the ROM 303, and carries out the overall control of various processes executed by the controller 11. The RAM 302 is system work memory used for operations of the CPU 301. The RAM 302 is a memory for temporarily storing image data. A boot program for the apparatus and so on are stored in the ROM 303.

The power control unit 304 controls the supply of power to the units in the image forming apparatus 100. The power control unit 304 will be described in detail later. The input/output I/F 305 is an interface unit for connecting the system bus 307 and the console unit 12. The input/output I/F 305 accepts image data for display in the console unit 12 from the system bus 307 and outputs that image data to the console unit 12, and outputs information input through the console unit 12 to the system bus 307. The LAN controller 306 sends and receives information to and from an external apparatus 20 connected to a network 30.

The HDD 308 is a hard disk drive that stores system software, image data, and so on. The image processing unit 309 is a unit for carrying out image processing. The image processing unit 309 reads out image data stored in the RAM 302 and carries out image processing such as enlarging and reducing JPEG or JBIG files, color adjustment, and so on. The scanner I/F 310 is an interface unit for communication between the scanner unit 13 and a scanner control unit 331. The printer I/F 311 is an interface unit for communication between the printer unit 14 and a printer control unit 341. The image bus 312 is a transmission path for exchanging image data, and is constituted of a bus such as a PCI bus, an IEEE 1394 bus, or the like.

The scanner unit 13 generates image data by optically reading an image from an original document, and includes the scanner control unit 331 and a scanner driving unit 332. The scanner driving unit 332 is a driving unit for moving a scanning head that reads the original document, and includes, for example, a driving unit for transporting the original document to a scanning position. The scanner control unit 331 controls the operations of the scanner driving unit 332. The scanner control unit 331 communicates with the CPU 301 to receive setting information set by a user for scanner processing, and controls the operations of the scanner driving unit 332 on the basis of that setting information.

The printer unit 14 forms an image on a recording medium (paper) through an electrophotographic method, and includes the printer control unit 341 and a printer driving unit 342. The printer driving unit 342 includes a motor that rotates a photosensitive drum (not illustrated), a mechanism unit for pressurizing a fixer, a heater, and so on. The printer control unit 341 controls the operations of the printer driving unit 342. The printer control unit 341 communicates with the CPU 301 to receive setting information set by a user for printing processing, and controls the operations of the printer driving unit 342 on the basis of that setting information.

Power Source Circuit

Figure 3:
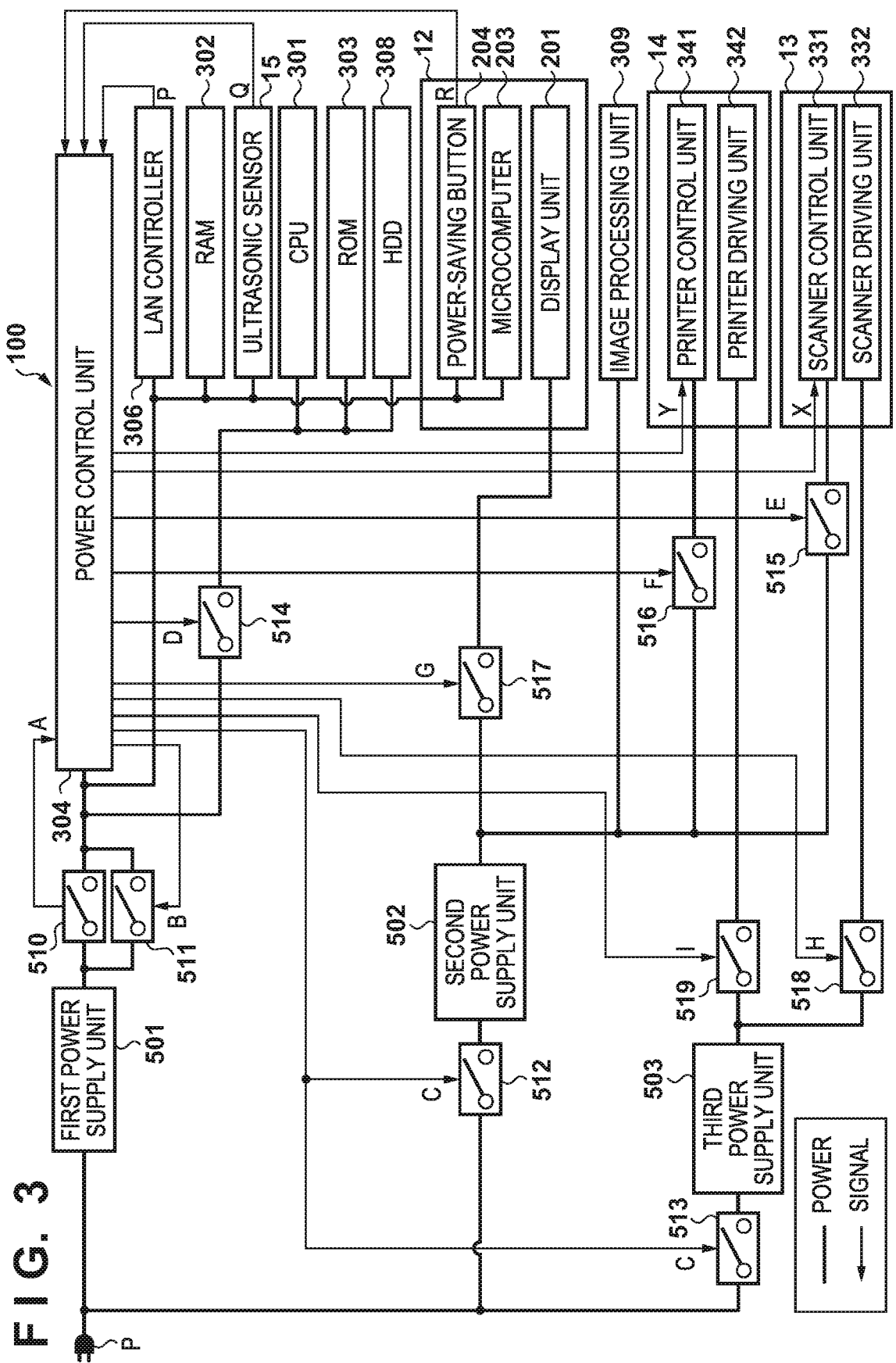
FIG. 3 is a power source circuit diagram of the image forming apparatus according to an embodiment.

Next, a power source circuit diagram of the image forming apparatus 100 will be described with reference to FIG. 3. The image forming apparatus 100 includes a first power supply unit 501, a second power supply unit 502, and a third power supply unit 503.

The first power supply unit 501 generates DC power at approximately 5.0 V from AC power supplied via a plug P. The first power supply unit 501 supplies the generated DC power to the LAN controller 306, the RAM 302, the ultrasonic sensor 15, the CPU 301, the ROM 303, and the HDD 308, as well as a power-saving button 204 of the console unit 12 and a microcomputer 203. The devices that receive the supply of power from the first power supply unit 501 will be collectively called "first power supply system devices" hereinafter.

The second power supply unit 502 generates DC power at approximately 12.0 V from AC power supplied via the plug P. The second power supply unit 502 supplies the generated DC power to a display unit 201, the image processing unit 309, the printer control unit 341, and the scanner control unit 331. The devices that receive the supply of power from the second power supply unit 502 will be collectively called "second power supply system devices" hereinafter.

The third power supply unit 503 generates DC power at approximately 24.0 V from AC power supplied via the plug P. The third power supply unit 503 supplies the generated DC power to the printer driving unit 342 and the scanner driving unit 332. The devices that receive the supply of power from the third power supply unit 503 will be collectively called "third power supply system devices" hereinafter.

A see-saw switch 510 that is turned on or off in response to a user operation is disposed between the first power supply unit 501 and the first power supply system devices. A relay switch 511 for supplying the power generated by the first power supply unit 501 to the first power supply system devices is disposed in parallel with the see-saw switch 510. Power is supplied from the first power supply unit 501 to the first power supply system devices via the relay switch 511 even if the see-saw switch 510 is turned off in response to a user operation.

The power control unit 304 is notified that the see-saw switch 510 has been turned off by a signal A. In the case where the see-saw switch 510 has been turned off, the power control unit 304 instructs the CPU 301 to execute a shut-down process. The power control unit 304 turns the relay switch 511 off upon the shut-down process being executed by the CPU 301. The image forming apparatus 100 is turned off as a result.

Meanwhile, a relay switch 512 that switches between allowing and cutting off the supply of power from the plug P to the second power supply unit 502 is disposed between the plug P and the second power supply unit 502. Additionally, a relay switch 513 that switches between allowing and cutting off the supply of power from the plug P to the third power supply unit 503 is disposed between the plug P and the third power supply unit 503.

A switch 514 that switches between allowing and stopping the supply of power to the CPU 301, the ROM 303, and the HDD 308 is disposed between the first power supply unit 501 and the CPU 301, the ROM 303, and the HDD 308. A switch 515 that switches between allowing and stopping the supply of power to the scanner control unit 331 is disposed between the scanner control unit 331 and the second power supply unit 502. A switch 516 that switches between allowing and stopping the supply of power to the printer control unit 341 is disposed between the printer control unit 341 and the second power supply unit 502. A switch 517 that switches between allowing and stopping the supply of power to the display unit 201 of the console unit 12 is disposed between the display unit 201 and the second power supply unit 502.

A switch 518 that switches between allowing and stopping the supply of power to the scanner driving unit 332 is disposed between the scanner driving unit 332 and the third power supply unit 503. A switch 519 that switches between allowing and stopping the supply of power to the printer driving unit 342 is disposed between the printer driving unit 342 and the third power supply unit 503.

The power control unit 304 will be described in detail next. The power control unit 304 is a logic circuit in which circuits can be reconfigured by changing the programming thereof. In the present embodiment, the power control unit 304 is a Complex Programmable Logic Device (CPLD). Here, the power control unit 304 detects a return factor for returning the image forming apparatus 100 from a power-saving state ST4. Details of the power-saving state ST4 will be given later using FIG. 4. The power control unit 304 carries out power control in accordance with the detected return factor. The return factor includes the following factors:

the see-saw switch 510 has changed from on to off
a specific packet (a print job, for example) has been received from the external apparatus 20
a human has approached the image forming apparatus 100
a user has pressed the power-saving button 204

Signals A, P, Q, and R, which indicate the aforementioned return factors, are input into the power control unit 304. The signal A indicates the state of the see-saw switch 510 (on or off). The signal P indicates that the LAN controller 306 has received a specific packet (a print job or the like) from the external apparatus 20. The signal Q indicates that the ultrasonic sensor 15 has detected an object such as a human. The signal R indicates that the user has pressed the power-saving button 204 of the console unit 12.

The power control unit 304 also outputs signals B, C, D, E, F, G, H, and I (controls the logic of the signals B, C, D, E, F, G, H, and I). The signal B switches the relay switch 511 on or off. The signal C switches the relay switches 512 and 513 on or off. The signal D switches the switch 514 on or off. The signal E switches the switch 515 on or off. The signal F switches the switch 516 on or off. The signal G switches the switch 517 on or off. The signal H switches the switch 518 on or off. The signal I switches the switch 519 on or off.

The logic of the signal A changes to low level upon the see-saw switch 510 being turned off in response to a user operation. Upon the logic of the signal A changing to low level, the power control unit 304 instructs the CPU 301 to shut down the image forming apparatus 100. The CPU 301 executes the shut-down process in accordance with this instruction. The power control unit 304 also controls the signal B and the signal C such that the relay switches 511, 512, and 513 are turned off. As a result, the image forming apparatus 100 can be turned off as appropriate after the shut-down process.

The logic of the signal P changes to hi level upon the LAN controller 306 receiving a specific packet (a print job) from the external apparatus 20. Upon the logic of the signal P changing to hi level, the power control unit 304 controls the signal C, the signal D, the signal F, and the signal I such that the relay switches 512, 513, 514, 516, and 519 turn on. As a result, the printer unit 14 executes printing on the basis of the print job.

The logic of the signal Q changes to hi level in the case where the ultrasonic sensor 15 has detected an object such as a human. Upon the logic of the signal Q changing to hi level, the power control unit 304 controls the signals C, D, E, F, H, and I such that the switches 512 to 516, 518, and 519 turn on. Furthermore, in the case where the ultrasonic sensor 15 has detected an object such as a human, the power control unit 304 changes the logic of signals Y and X to hi level. The display unit 201 is lighted in the case where the ultrasonic sensor 15 has detected a human.

The signal X is a signal for switching between whether the scanner control unit 331 will start up and drive the scanner driving unit 332, or start up without driving the scanner driving unit 332. In the case where the logic of the signal X is hi level when power is supplied to the scanner control unit 331, the scanner control unit 331 starts up the scanner unit 13 with the driving of the scanner driving unit 332 remaining stopped (this is called a "low-noise startup" of the scanner unit 13 hereinafter). Meanwhile, in the case where the logic of the signal X is low level when power is supplied to the scanner control unit 331, the scanner control unit 331 drives the scanner driving unit 332 and starts up the scanner unit 13.

Likewise, the signal Y is a signal for switching between whether the printer control unit 341 will start up and drive the printer driving unit 342, or start up without driving the printer driving unit 342. In the case where the logic of the signal Y is hi level when power is supplied to the printer control unit 341, the printer control unit 341 starts up the printer unit 14 with the driving of the printer driving unit 342 remaining stopped (this is called a "low-noise startup" of the printer unit 14 hereinafter). Meanwhile, in the case where the logic of the signal Y is low level when power is supplied to the printer control unit 341, the printer control unit 341 drives the printer driving unit 342 and starts up the printer unit 14.

The logic of the signal R changes to hi level upon the user pressing the power-saving button 204. Upon the logic of the signal R changing to hi level, the power control unit 304 controls the signals C to I such that the relay switches 512 to 519 turn on. Additionally, the power control unit 304 changes the logic of the signals Y and X to hi level in the case where the power-saving button 204 has been pressed. Furthermore, the display unit 201 is lighted in the case where the power-saving button 204 has been pressed. Note that the switches 511 to 519 may be FETs.

State Transitions

Figure 4:
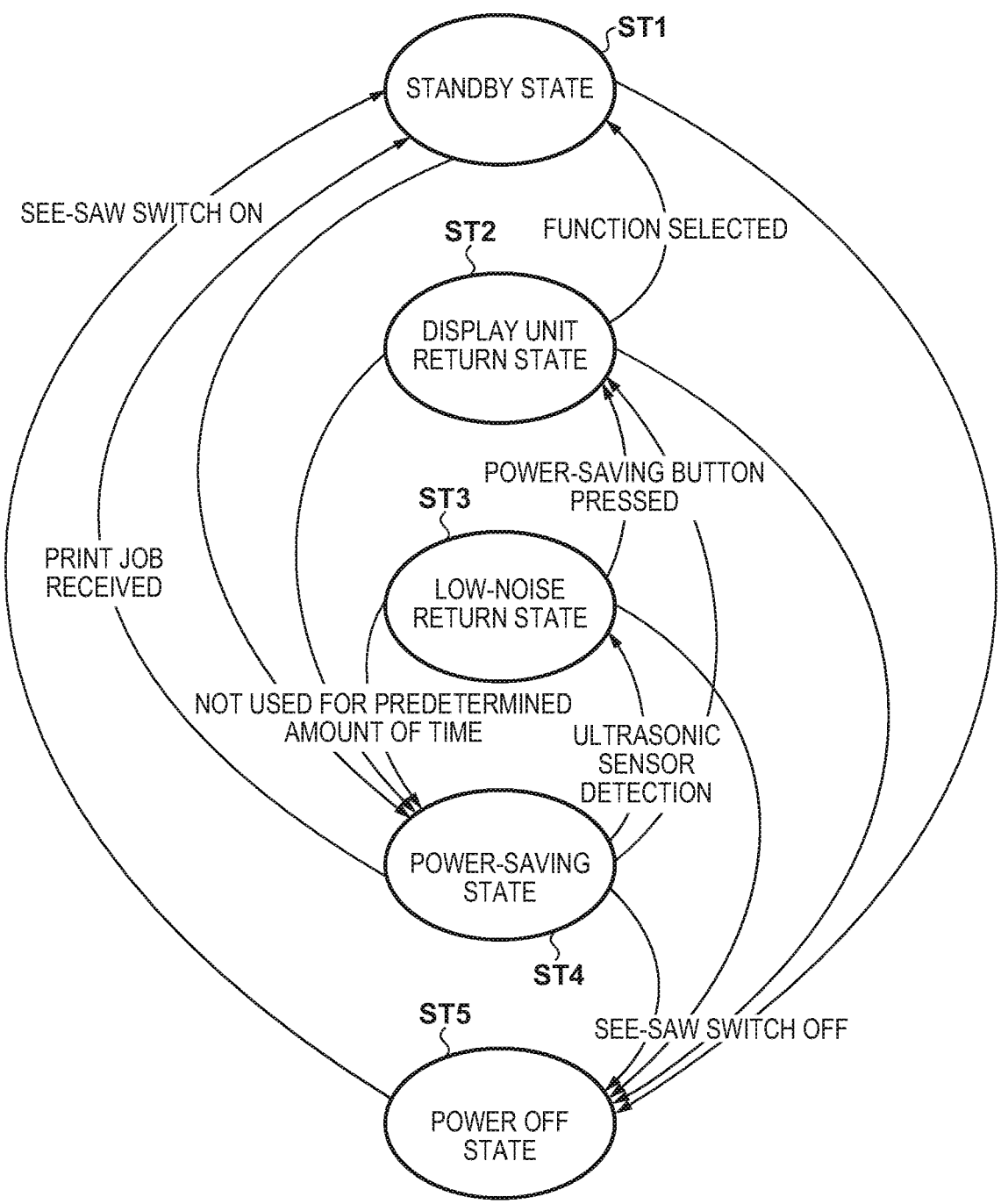
FIG. 4 is a state transition chart of the image forming apparatus according to an embodiment.

Next, state transitions of the image forming apparatus 100 will be described with reference to FIG. 4. As operating states, the image forming apparatus 100 has a standby state (a first power supply state) ST1, a display unit return state (a fourth power supply state) ST2, a low-noise return state (a third power supply state) ST3, the power-saving state (a second power supply state) ST4, and a power off state ST5. The display unit return state ST2, the low-noise return state ST3, and the power-saving state ST4 are states in which the supply of power to loads included in the image forming apparatus 100 is partially stopped.

The standby state ST1 is a state in which scanning operations of the scanner unit 13, printing operations of the printer unit 14, and so on can be executed. In the case where the image forming apparatus 100 is not used for a predetermined amount of time, such as the console unit 12 not being operated for a predetermined amount of time and a job not being received from the external apparatus 20, while in the standby state ST1, the image forming apparatus 100 transitions from the standby state ST1 to the power-saving state ST4.

The power-saving state ST4 is a state in which less power is consumed than in the standby state ST1. In the power-saving state ST4, power is supplied only to the devices necessary for returning from the power-saving state ST4 (the ultrasonic sensor 15, the LAN controller 306, and so on). In the case where the ultrasonic sensor 15 has detected a human while in the power-saving state ST4, the image forming apparatus 100 transitions to the low-noise return state ST3 or the display unit return state ST2, and resumes the supply of power to some of the loads. Whether to transition to ST3 or ST2 is determined in accordance with variation in the distance in each detection time of the ultrasonic sensor 15.

In the low-noise return state ST3, the CPU 301, the image processing unit 309, and the HDD 308 of the controller 11, as well as the scanner unit 13 and the printer unit 14, are started up. Note that the printer control unit 341 and the scanner control unit 331 restrict the driving of the printer driving unit 342 and the scanner driving unit 332. As such, the image forming apparatus 100 starts up quietly. As a result of this startup, the CPU 301, the image processing unit (ASIC) 308, a CPU of the scanner control unit 331, and a CPU of the printer control unit 341 are initialized. In the case where a print job for causing the printer unit 14 to execute printing has been received from the external apparatus 20 while in the power-saving state ST4, the image forming apparatus 100 transitions to the standby state ST1.

Note that when the power-saving button 204 is pressed by the user while in the power-saving state ST4, the state transitions to the display unit return state ST2, which will be described later. In the present embodiment, it is assumed that the user has been detected by the ultrasonic sensor 15 before the power-saving button 204 is pressed, and thus it is assumed that the power-saving button 204 will not be pressed while in the power-saving state ST4.

The state transitions to the display unit return state ST2, in which the display unit 201 is lighted, upon the power-saving button 204 being pressed while in the low-noise return state ST3. Accordingly, the user can select functions of the image forming apparatus 100 through a main menu screen (a selection screen) 201a (FIG. 9B) displayed in the display unit 201.

In the case where a function of the image forming apparatus 100 has been selected through the main menu screen 201a displayed in the display unit return state ST2, the state transitions to the standby state ST1, in which the selected function can be executed. For example, in the case where the printing function has been selected through the main menu screen 201a, the restriction on the driving of the printer driving unit 342 is canceled and the printer driving unit 342 is driven. Additionally, in the case where the scanner function has been selected through the main menu screen 201a, the restriction on the driving of the scanner driving unit 332 is canceled and the scanner driving unit 332 is driven. Finally, the image forming apparatus 100 transitions to the power off state ST5 in the case where the see-saw switch 510 is switched from on to off in response to a user operation.

Operating States

Figure 5:
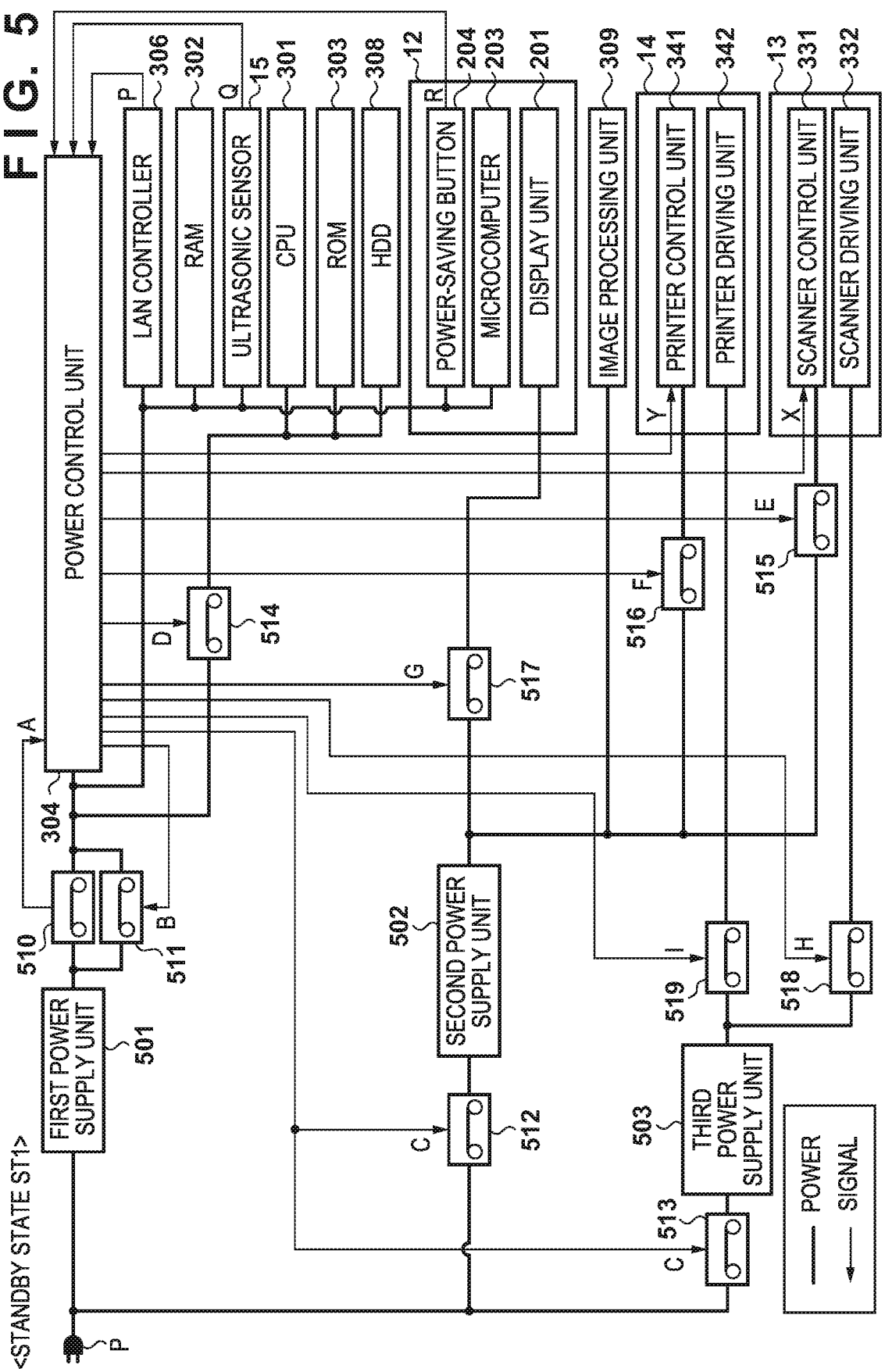
FIG. 5 is a diagram illustrating the image forming apparatus in a standby state according to an embodiment.

Next, detailed power supply states in the operating states described above will be described with reference to FIGS. 5 to 8. FIG. 5 illustrates a power supply state in the standby state ST1. As illustrated in FIG. 5, in the standby state ST1, the switches 510 to 519 of the image forming apparatus 100 are on, and power is supplied to the various units of the image forming apparatus 100.

Figure 6:
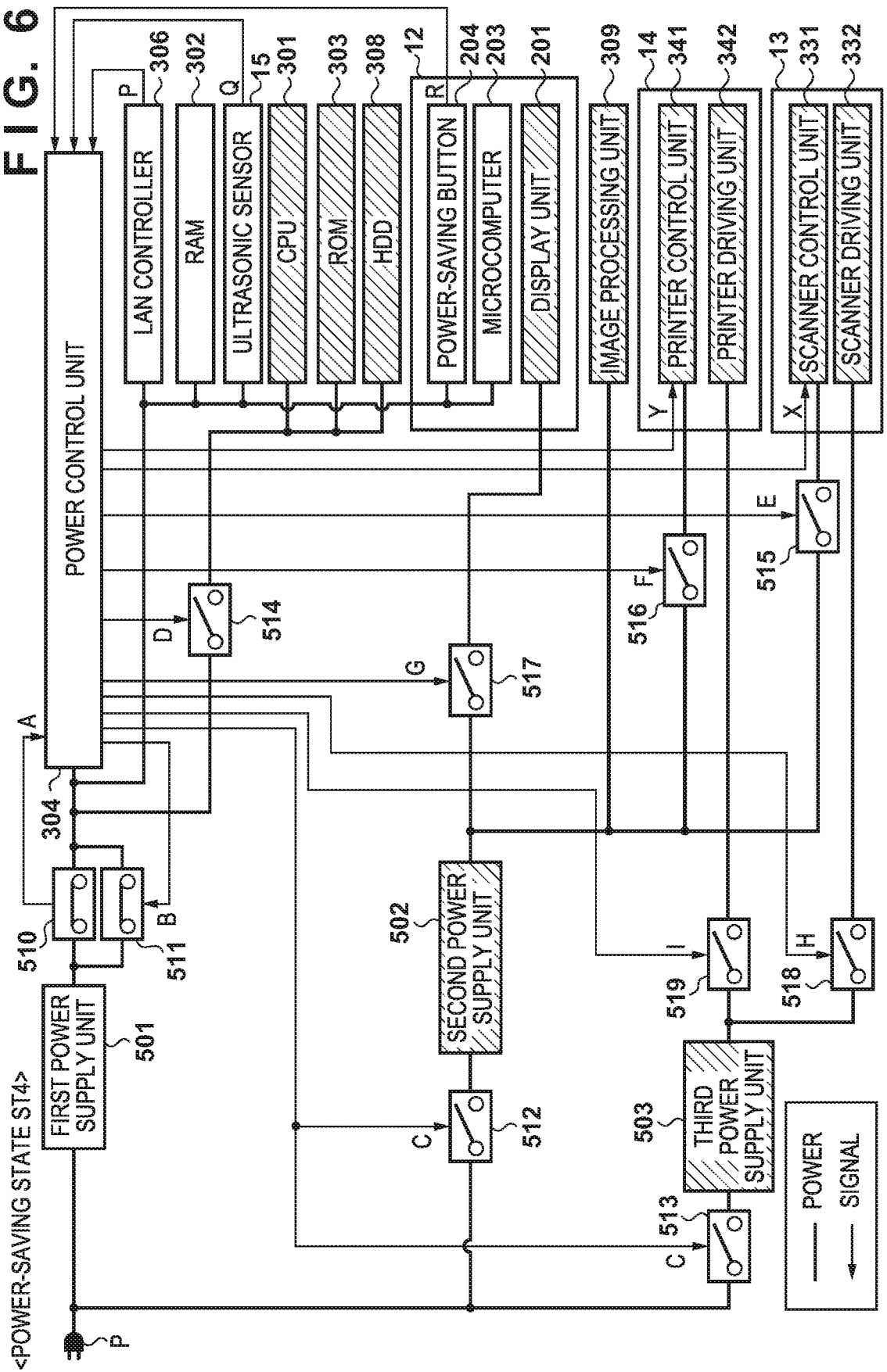
FIG. 6 is a diagram illustrating the image forming apparatus in a power-saving state according to an embodiment.

FIG. 6 illustrates a power supply state in the power-saving state ST4. As illustrated in FIG. 6, in the power-saving state ST4, power is supplied to only some of the first power supply system devices. In the power-saving state ST4, the relay switch 511 for supplying the power generated by the first power supply unit 501 is on, but the other switches 512 to 519 are off. Accordingly, power is supplied to the power control unit 304, the RAM 302, the LAN controller 306, the ultrasonic sensor 15, the power-saving button 204, and the microcomputer 203 in the power-saving state ST4. Note that the microcomputer 203 may supply power when the ultrasonic sensor 15 has detected a human.

Figure 7:
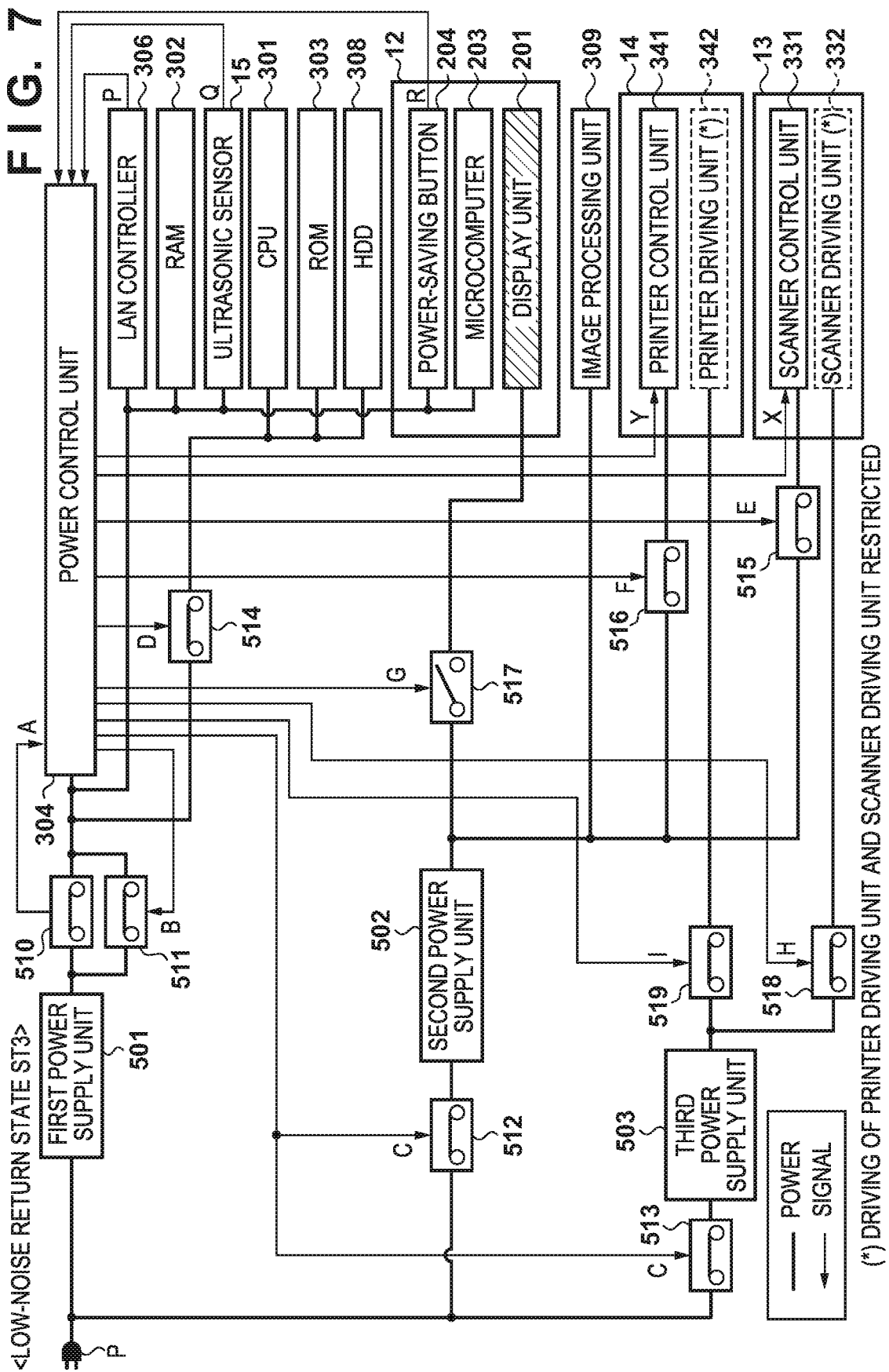
FIG. 7 is a diagram illustrating the image forming apparatus in a low-noise return state according to an embodiment.

FIG. 7 illustrates a power supply state in the low-noise return state ST3. As illustrated in FIG. 7, in the low-noise return state ST3, power is supplied to the CPU 301, the HDD 308, the ROM 303, the image processing unit 309, the printer unit 14, and the scanner unit 13, in addition to the devices to which power is supplied in the power-saving state ST4. In other words, the switches aside from the relay switch 517 are turned on. Note that the printer control unit 341 and the scanner control unit 331 restrict the driving of the printer driving unit 342 and the scanner driving unit 332, respectively.

FIG. 8 illustrates a power supply state in the display unit return state ST2. As illustrated in FIG. 8, in the display unit return state ST2, power is supplied to the display unit 201 in addition to the devices to which power is supplied in the low-noise return state ST3. Although the relay switches 511 to 517 are turned on, the switches 518 to 519 are turned off. As a result, the display unit 201 can display various types of information.

Console Unit and Screen Examples

Figure 9A:
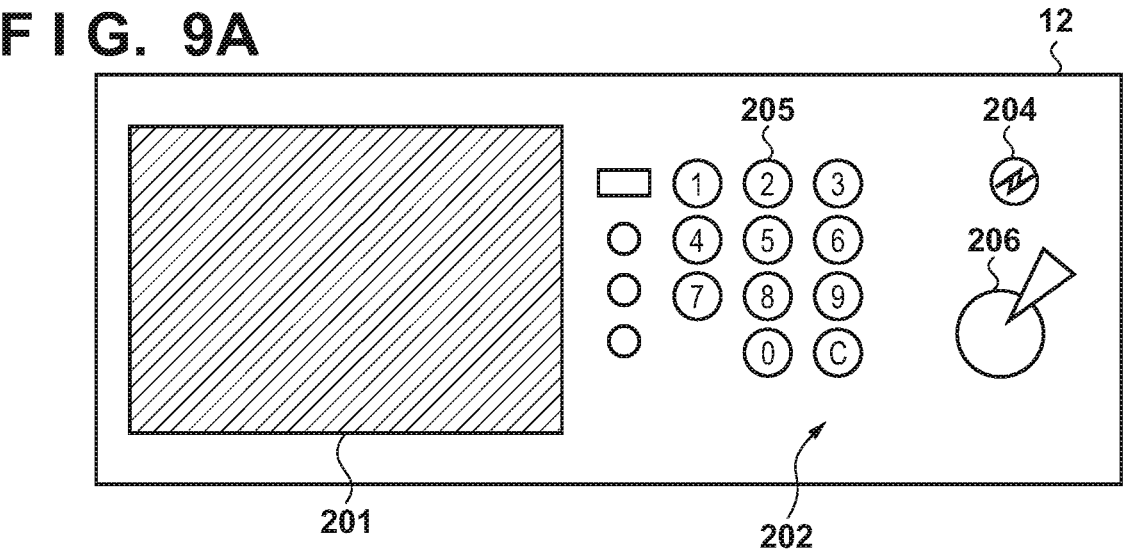
FIGS. 9A, 9B, and 9C are diagrams illustrating, in detail, a console unit according to an embodiment.
Figure 9B:
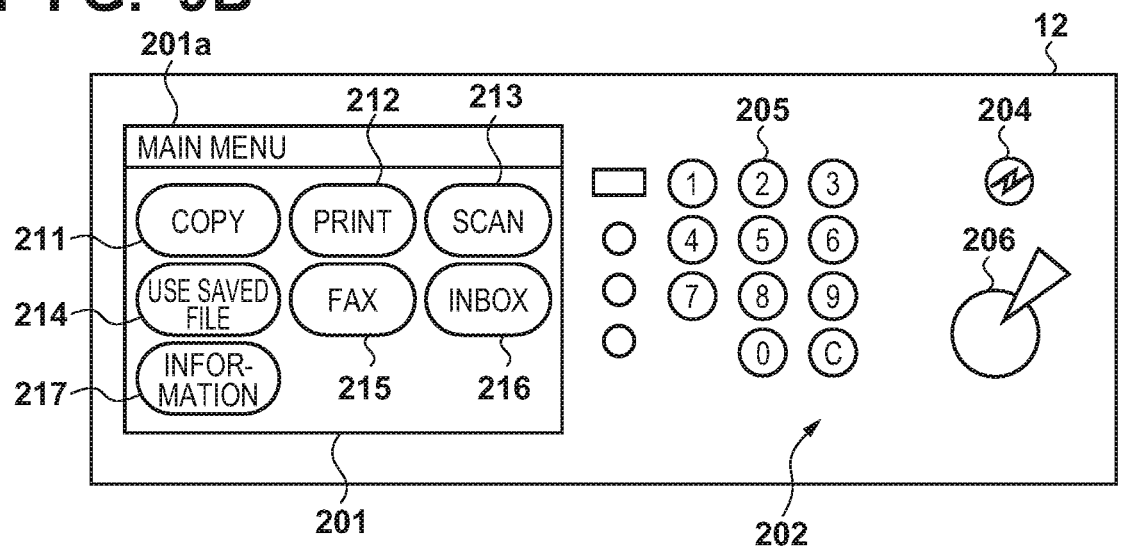
Figure 9C:
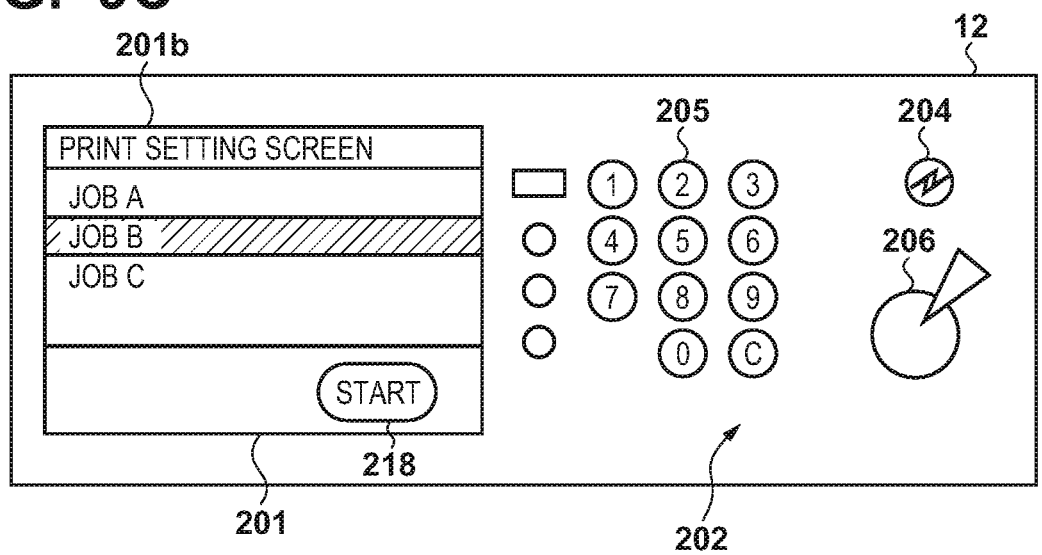

Next, the console unit 12 and examples of screens displayed in the console unit 12 will be described with reference to FIGS. 9A to 9C. As illustrated in FIGS. 9A to 9C, the console unit 12 includes the display unit 201, buttons 202, and the microcomputer 203 (FIG. 3).

The display unit 201 displays various types of images. Specifically, the microcomputer 203 functions as a display control unit, and the main menu screen (selection screen) 201a (FIG. 9B) for selecting the copy function, the printing function, the scanning function, or the like, is displayed in the display unit 201. Additionally, the microcomputer 203 displays a setting screen 201b (FIG. 9C) for executing the function selected through the main menu screen 201a in the display unit 201.

As illustrated in FIG. 9A, the display unit 201 is in a non-display state, in which no screen is displayed in the display unit 201, while in the power off state ST5, the power-saving state ST4, and the low-noise return state ST3. This non-display state may be a state in which a screen to be displayed in the display unit 201 is rendered but a backlight of the display unit 201 is off, or may be a state in which the display unit 201 is off and no image is rendered in the display unit 201. On the other hand, a state in which a screen is displayed in the display unit 201, as illustrated in FIGS. 9B and 9C, is called a "display state".

As illustrated in FIG. 9B, the main menu screen 201a includes a copy icon 211 for executing the copy function, a print icon 212 for executing the printing function, and a scan icon 213 for executing the scanner function. Additionally, the main menu screen 201a includes a saved file usage icon 214 for using a file saved in the HDD 308, and a fax icon 215 for executing the fax function. Furthermore, the main menu screen 201a includes an inbox icon 216 for confirming received emails, an information icon 217 for displaying various types of information, and so on.

Meanwhile, as illustrated in FIG. 9C, the setting screen 201b includes a start button 218 for making an instruction to execute a selected job ("JOB B" is selected in the example illustrated in FIG. 9C).

The buttons 202 include a start key 206 for making execution instructions such as starting copying, starting scanning, and so on. The buttons 202 also include the power-saving button 204. When the user presses the power-saving button 204 while the image forming apparatus 100 is in the standby state ST1, the image forming apparatus 100 transitions to the power-saving state ST4. Meanwhile, when the user presses the power-saving button 204 while the image forming apparatus 100 is in the power-saving state ST4, the image forming apparatus 100 transitions to the standby state ST1. The buttons 202 also include a numerical keypad 205 for inputting a number of copies or the like.

Power Control

Figure 10:
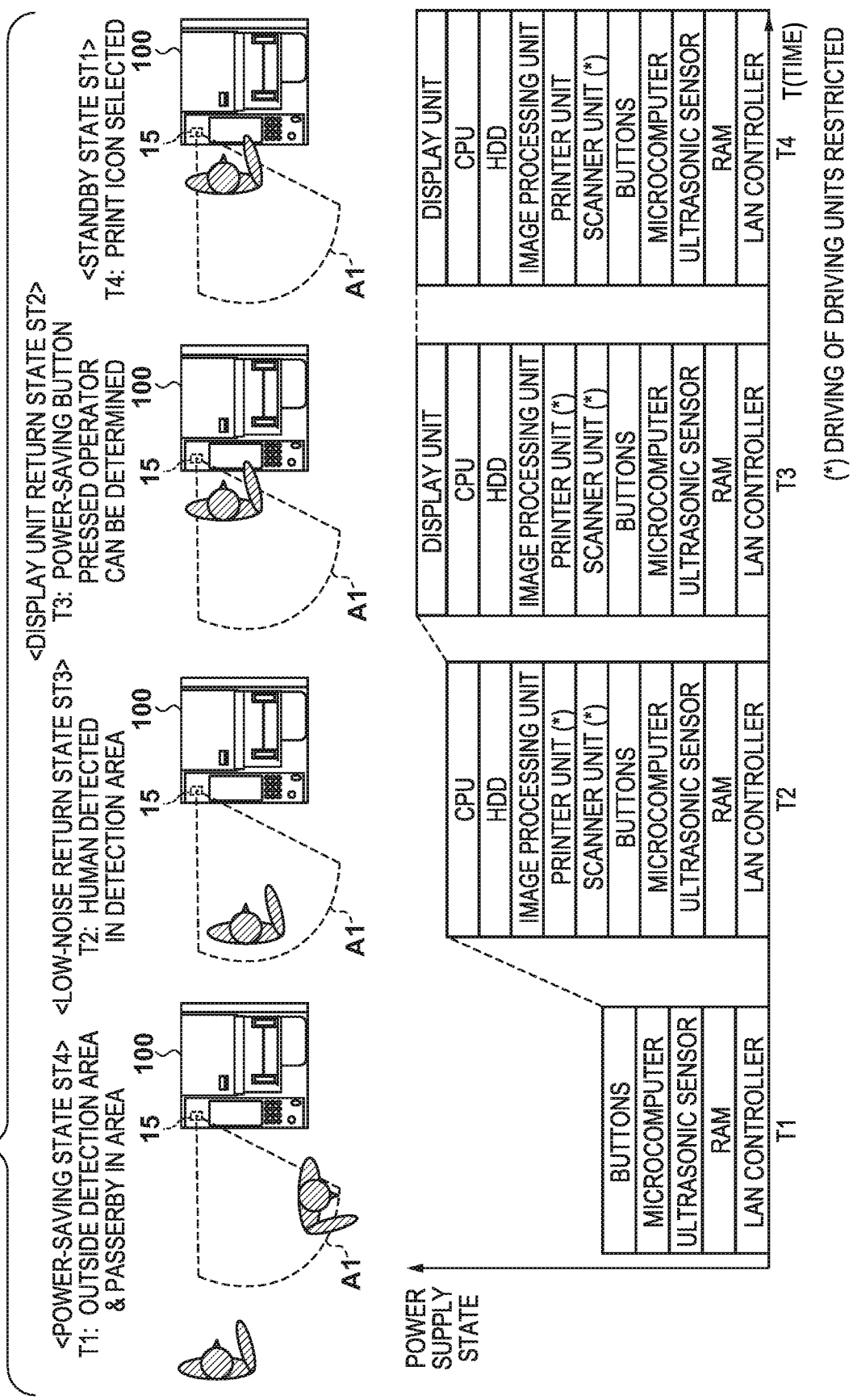
FIG. 10 is a diagram illustrating power control transitions depending on a distance between the image forming apparatus and an operator according to an embodiment.

Next, power control carried out in accordance with a distance between the image forming apparatus 100 and an operator will be described with reference to FIG. 10. The upper section of FIG. 10 illustrates a relationship of the distance between the image forming apparatus 100 and the operator, whereas the lower section of FIG. 10 illustrates the power supply state of the image forming apparatus 100 in the case where the operator is present in the position indicated in the upper section. In the lower section, the horizontal axis represents time, whereas the vertical axis represents blocks to which power is supplied. For example, in a state T1, power is supplied to the LAN controller, the RAM, the ultrasonic sensor, the microcomputer, and the buttons.

In the state T1, in which a human is not present within the detection area A1 of the ultrasonic sensor 15, or a human was within the detection area A1 but was determined to be a passerby, the image forming apparatus 100 stands by in the power-saving state ST4. Power is supplied only to a limited number of devices, such as the ultrasonic sensor 15, in the power-saving state ST4. Specifically, in the power-saving state ST4, power is supplied to the LAN controller 306, the RAM 302, the ultrasonic sensor 15, the microcomputer 203, and the power-saving button 204.

A state T2 is a state in which the presence of a human has been confirmed in the detection area A1 of the ultrasonic sensor 15, but that human is not determined to be an operator. Power is supplied only to some parts, such as the controller 11, in the state T2. Specifically, in the state T2, power is supplied to the scanner unit 13, the printer unit 14, the image processing unit 309, the HDD 308, and the CPU 301, in addition to the devices to which power is supplied in the power-saving state ST4. As a result, the controller 11, the scanner unit 13, and the printer unit 14 begin to start up. However, the scanner control unit 331 restricts the driving of the scanner driving unit 332, and the printer control unit 341 restricts the driving of the printer driving unit 342. As such, even though the startup has begun, the startup is begun in a state in which the printer driving unit 342 does not emit driving noise.

Note that according to the present embodiment, power is not supplied to the display unit 201 of the image forming apparatus 100 used by the operator at the point in time of the state T2. However, in the state T2, the power-saving button 204 is lighted or flashed in order to guide a human intending to use the image forming apparatus 100 to the location that should be operated next.

A state T3 is a state arising in the case where a user who has approached the image forming apparatus 100 has pressed the power-saving button 204, or in the case where a human within the area has been successfully determined to be an operator. In the state T3, power is supplied to the display unit 201 and a screen is displayed in the display unit 201. The operator presses the power-saving button 204 with the intent of using the image forming apparatus 100, and thus in the present embodiment, power is supplied to the display unit 201 upon the power-saving button 204 being pressed. Upon the power-saving button 204 being pressed, the main menu screen 201a for selecting the functions of the image forming apparatus 100 (copying, printing, scanning, box, fax, and so on) is displayed in the display unit 201.

A state T4 is a state arising in the case where the operator has selected a function in the main menu screen 201a. In the state T4, power is supplied to the areas necessary for that function to be executed. A case where the print icon 212 displayed in the main menu screen 201a has been selected will be described here. Upon the print icon 212 being selected in the main menu screen 201a, the printer control unit 341 cancels the restriction on the driving of the printer driving unit 342.

Processing Sequence

Figure 11:
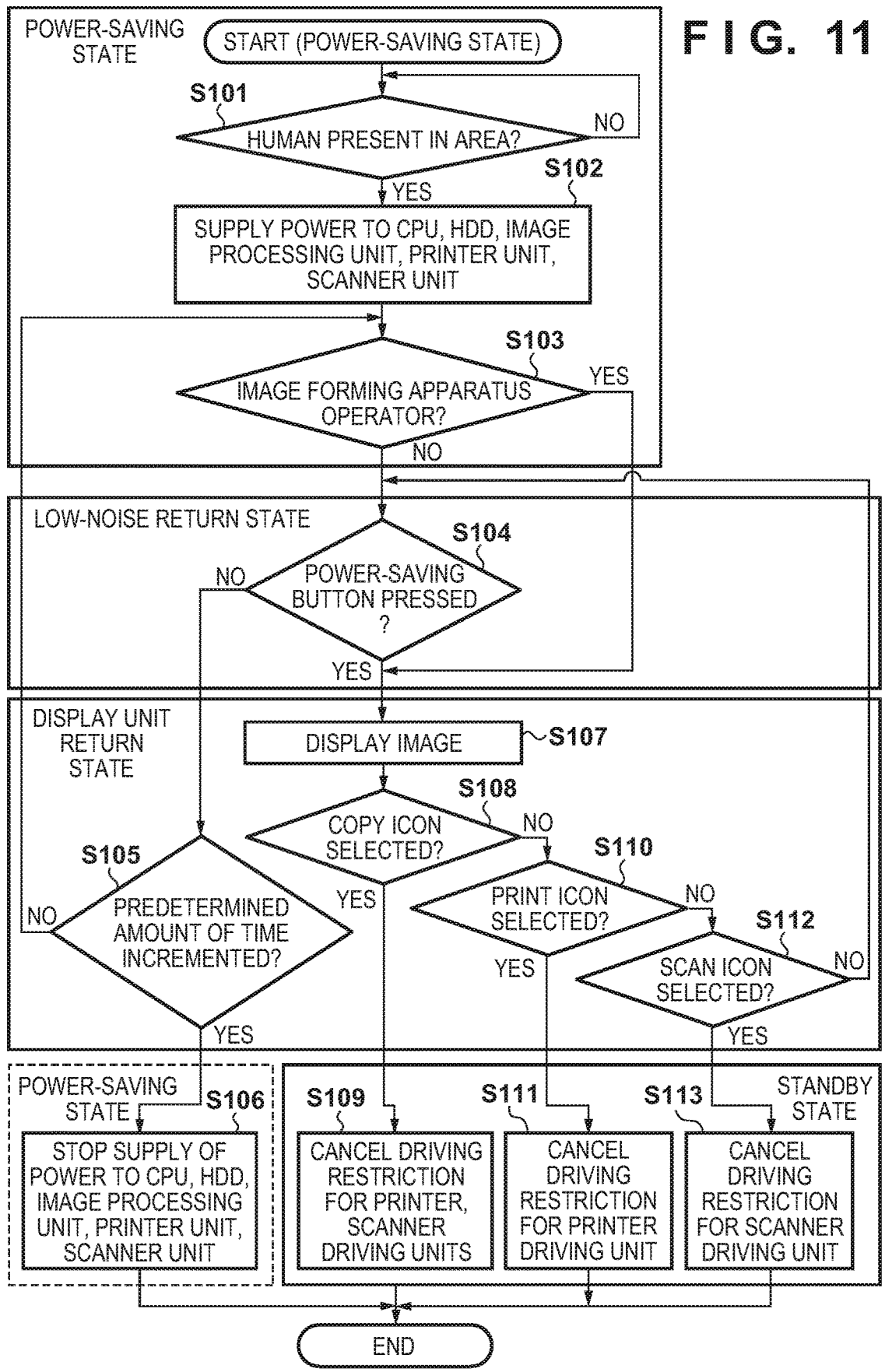
FIG. 11 is a flowchart illustrating a flow of power control in the image forming apparatus according to an embodiment.

Next, a processing sequence for a series of operations in which the image forming apparatus 100 returns from the power-saving state ST4 to the standby state ST1 will be described with reference to FIG. 11. The processes indicated in the flowchart of FIG. 11 are realized by the microcomputer 203 of the console unit 12 executing programs.

First, the image forming apparatus 100 stands by in the power-saving state ST4. In S101, the microcomputer 203 determines whether there is a human present in the detection area A1 of the ultrasonic sensor 15, and in the case where a human is present, whether or not that human is a passerby. Specifically, the microcomputer 203 receives a signal output in the case where the ultrasonic sensor 15 has detected a human, and determines that a human has entered the detection area A1 of the ultrasonic sensor 15. However, a human is not determined to have entered in the case where the human moved away immediately after being detected, or was only successfully detected for a short period (S101: no).

On the other hand, in the case where a human has been determined to be present in the detection area A1 of the ultrasonic sensor 15, the process moves to S102, where the microcomputer 203 instructs the power control unit 304 to supply power to the CPU 301, the HDD 308, the image processing unit 309, the printer unit 14, and the scanner unit 13. Specifically, the power control unit 304 detects that the signal Q has changed to hi level. Then, the power control unit 304 controls the logic of the signals C, D, E, F, G, H, and I such that power is supplied to the CPU 301, the HDD 308, the image processing unit 309, the printer unit 14, and the scanner unit 13. The CPU 301, the HDD 308, the image processing unit 309, the printer unit 14, and the scanner unit 13 to which power is supplied begin to start up. Note that power is not supplied to the display unit 201 at this point in time. Furthermore, the driving of the printer driving unit 342 and the scanner driving unit 332 is restricted at this point in time, and thus driving noise from the printer driving unit 342 and the scanner driving unit 332 is not produced by the aforementioned startup.

Then, in S103, the microcomputer 203 determines whether or not the human is an operator of the image forming apparatus 100, on the basis of transitions in the distance measured each amount of time by the ultrasonic sensor 15 (that is, detection results). The method of this determination will be described in detail later. In the case where the human is successfully determined to be the operator, the process moves to S107, where the microcomputer 203 makes a screen display. However, in the case where the human cannot be determined to be the operator, the microcomputer 203 transitions the operating state to the low-noise return state, in which a screen display is not carried out.

Upon transitioning to the low-noise return state, in S104, the microcomputer 203 determines whether or not the power-saving button 204 has been pressed. The process moves to S105 in the case where the button has not been pressed, but moves to S107 in the case where the button has been pressed. In S105, the microcomputer 203 determines whether or not a predetermined amount of time has passed without the power-saving button 204 being pressed. The process moves to S106 in the case where the predetermined amount of time has passed, but returns to S103 when such is not the case.

In S106, the microcomputer 203 instructs the power control unit 304 to stop the supply of power to the CPU 301, the HDD 308, the image processing unit 309, the printer unit 14, and the scanner unit 13, and then ends the processing. Having received this instruction, the power control unit 304 controls the logic of the signals C, D, E, F, G, H, and I such that the supply of power to the CPU 301, the HDD 308, the image processing unit 309, the printer unit 14, and the scanner unit 13 is stopped. As a result, the image forming apparatus 100 transitions to the power-saving state ST4.

Meanwhile, in the case where it has been determined that the power-saving button 204 has been pressed by the user before the predetermined amount of time has passed, in S107, the microcomputer 203 displays the main menu screen 201a in the display unit 201. In S108, the microcomputer 203 determines whether or not the copy icon 211 has been selected by the user through the main menu screen 201a. In the case where the icon is selected, the process moves to S109, whereas when such is not the case, the process moves to S110. In S109, the microcomputer 203 cancels the restriction on the driving of the printer driving unit 342 and the scanner driving unit 332, which are necessary for executing the copy function, and ends the processing. As a result, the operating state transitions to the standby state ST1, in which the copy function can be executed.

On the other hand, in S110, the microcomputer 203 determines whether or not the print icon 212 has been selected by the user through the main menu screen 201a. In the case where the icon is selected, the process moves to S111, whereas when such is not the case, the process moves to S112. In S111, the microcomputer 203 cancels the restriction on the driving of the printer driving unit 342, which is necessary for executing the printing function, and ends the processing. As a result, the operating state transitions to the standby state ST1, in which the printing function can be executed.

In S112, the microcomputer 203 determines whether or not the scan icon 213 has been selected by the user through the main menu screen 201a. In the case where the icon is selected, the process moves to S113, whereas when such is not the case, the process returns to S104. In S113, the microcomputer 203 cancels the restriction on the driving of the scanner driving unit 332, which is necessary for executing the scanning function, and ends the processing. As a result, the operating state transitions to the standby state ST1, in which the scanner function can be executed.

Although an example in which the copy icon 211, the print icon 212, and the scan icon 213 are selected in the main menu screen 201a is described here, the same applies in the case where another icon is selected. In the case where another icon has been selected, power is supplied to the functional units (for example, the fax unit or the like) necessary for executing the function corresponding to the selected icon. For example, in the case where the fax icon 215 has been selected in the main menu screen 201a, power is supplied to the scanner unit 13, which is necessary for sending a fax.

Human Detection

Figure 12:
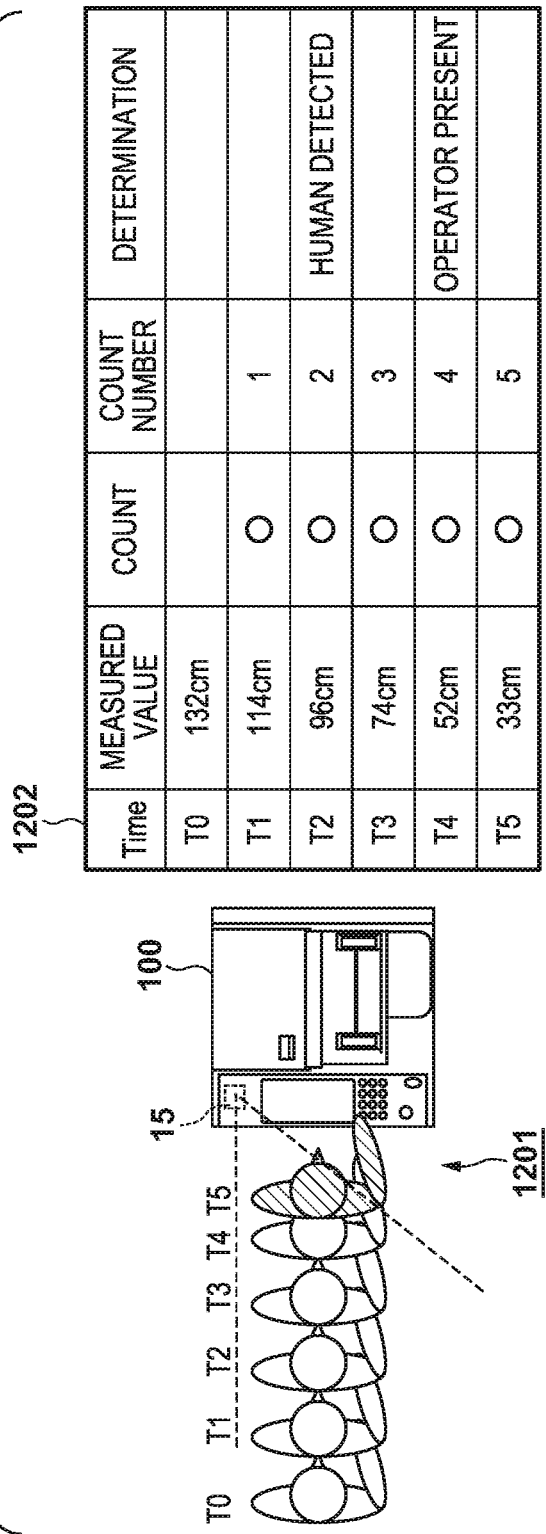
FIG. 12 is a diagram illustrating an example of a human approaching the image forming apparatus according to an embodiment.

Next, a method of detecting a human located near the image forming apparatus 100 will be described in detail with reference to FIGS. 12 and 13. FIG. 12 illustrates transitions in the distance between the image forming apparatus 100 and the human every amount of time. Here, the way in which the microcomputer 203 of the console unit 12 determines a human to be a passerby or an operator of the image forming apparatus 100 on the basis of the transitions in the distances each amount of time measured by the ultrasonic sensor 15, as determined in S101 and S103 of FIG. 11, will be described. 1201 in FIG. 12 indicates the distance between the image forming apparatus 100 and the operator, whereas 1202 indicates whether the microcomputer 203 has counted a human on the basis of distance information, a count number, and details of the human detection determination. In the example illustrated in FIG. 12, a human is determined to have been detected in the case where the count number is 2, and an operator is determined to have been detected in the case where the count number is 4.

The microcomputer 203 of the console unit 12 counts a human detection upon it being determined that an object has been detected in the detection area at the point in time of the state T1. The count is 2 at the point in time of the state T2, and thus it is determined that a human has been detected (S101: Yes in FIG. 11). Meanwhile, the count number has reached 4 at the point in time of the state T4, and thus the human is determined to be an operator (S103: Yes in FIG. 11).

In this manner, according to the present embodiment, the determination as to whether a human or an operator has been detected is made on the basis of the number of times an object detection has been counted. Several examples of how the object detections are counted will be described hereinafter. In the present embodiment, the image forming apparatus 100 determines a moving amount determination value in accordance with the distance when the object is first detected. A moving amount of the human is calculated from the distances measured each amount of time, the moving amount determination value and the moving amount of the human are compared, and a count is made in the case where the moving amount of the human is greater than the moving amount determination value. Here, "moving amount" refers to a difference between the distance measured the previous time and the distance measured the current time.

FIG. 13 illustrates an example of settings for the moving amount determination value, made in accordance with the distance when the object is first detected. For example, in the case where the distance is 141 to 180 cm, a count is made when the moving amount is greater than or equal to 20 cm. The moving amount determination value is infinite at a distance of greater than or equal to 181 cm, and thus a setting is made such that a count is not made even if a human is moving. On the other hand, in the case where the distance is 0 to 60 cm, the moving amount determination value is set to 0 cm. In this manner, according to the present embodiment, the moving amount determination value is set lower as the location where the object is first detected becomes closer to the image forming apparatus 100. Preferably, this moving amount refers to detecting movement toward the image forming apparatus 100. This is because the human can be determined to be a passerby in the case where the moving amount is for detecting movement away from the image forming apparatus 100. Note that the numerical values indicated in FIG. 13 are merely examples, and are not intended to limit the present invention. In other words, optimal values can be set in accordance with the environment in which the image forming apparatus 100 is installed and so on.

Setting of Moving Amount Determination Value

Figure 14:
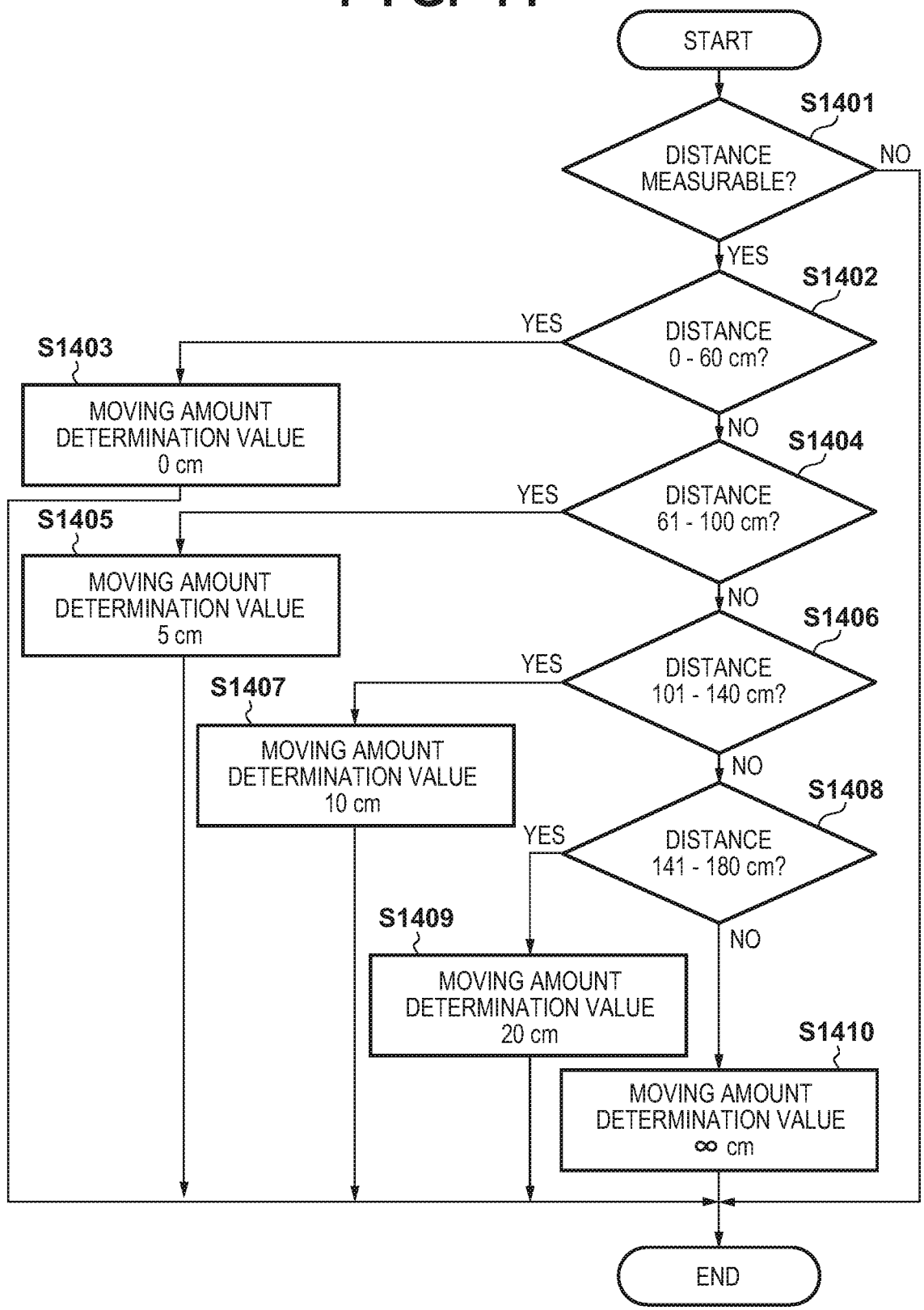
FIG. 14 is a flowchart illustrating the setting of a moving amount determination value in accordance with a measured distance according to an embodiment.

Next, a processing sequence through which the microcomputer 203 of the console unit 12 sets the moving amount determination value in accordance with the distance when the object is first detected will be described with reference to FIG. 14. The processes indicated in the flowchart of FIG. 14 are realized by the microcomputer 203 of the console unit 12 executing programs.

In S1401, the microcomputer 203 first determines whether or not the distance to the object can be measured. The process ends in the case where the distance cannot be confirmed, but advances to S1402 in the case where the distance can be confirmed. In S1402, to set the moving amount determination value in accordance with the distance, the microcomputer 203 first determines whether or not the distance is 0 to 60 cm. In the case where the distance is 0 to 60 cm, the process moves to S1403, whereas when such is not the case, the process moves to S1404. In S1403, the microcomputer 203 sets the moving amount determination value to 0 cm.

Meanwhile, in S1404, the microcomputer 203 determines whether or not the distance is 61 to 100 cm. In the case where the distance is 61 to 100 cm, the process moves to S1405, whereas when such is not the case, the process moves to S1406. In S1405, the microcomputer 203 sets the moving amount determination value to 5 cm. Meanwhile, in S1406, the microcomputer 203 determines whether or not the distance is 101 to 140 cm. In the case where the distance is 101 to 140 cm, the process moves to S1407, whereas when such is not the case, the process moves to S1408. In S1407, the microcomputer 203 sets the moving amount determination value to 10 cm.

Meanwhile, in S1408, the microcomputer 203 determines whether or not the distance is 141 to 180 cm. In the case where the distance is 141 to 180 cm, the process moves to S1409, whereas when such is not the case, the process moves to S1410. In S1409, the microcomputer 203 sets the moving amount determination value to 20 cm. On the other hand, in S1410, the microcomputer 203 determines that the distance is greater than or equal to 181 cm, sets the moving amount determination value to infinite, carries out control such that a human is substantially not detected even if the human is moving, and ends the processing.

Count Determination

Figure 15:
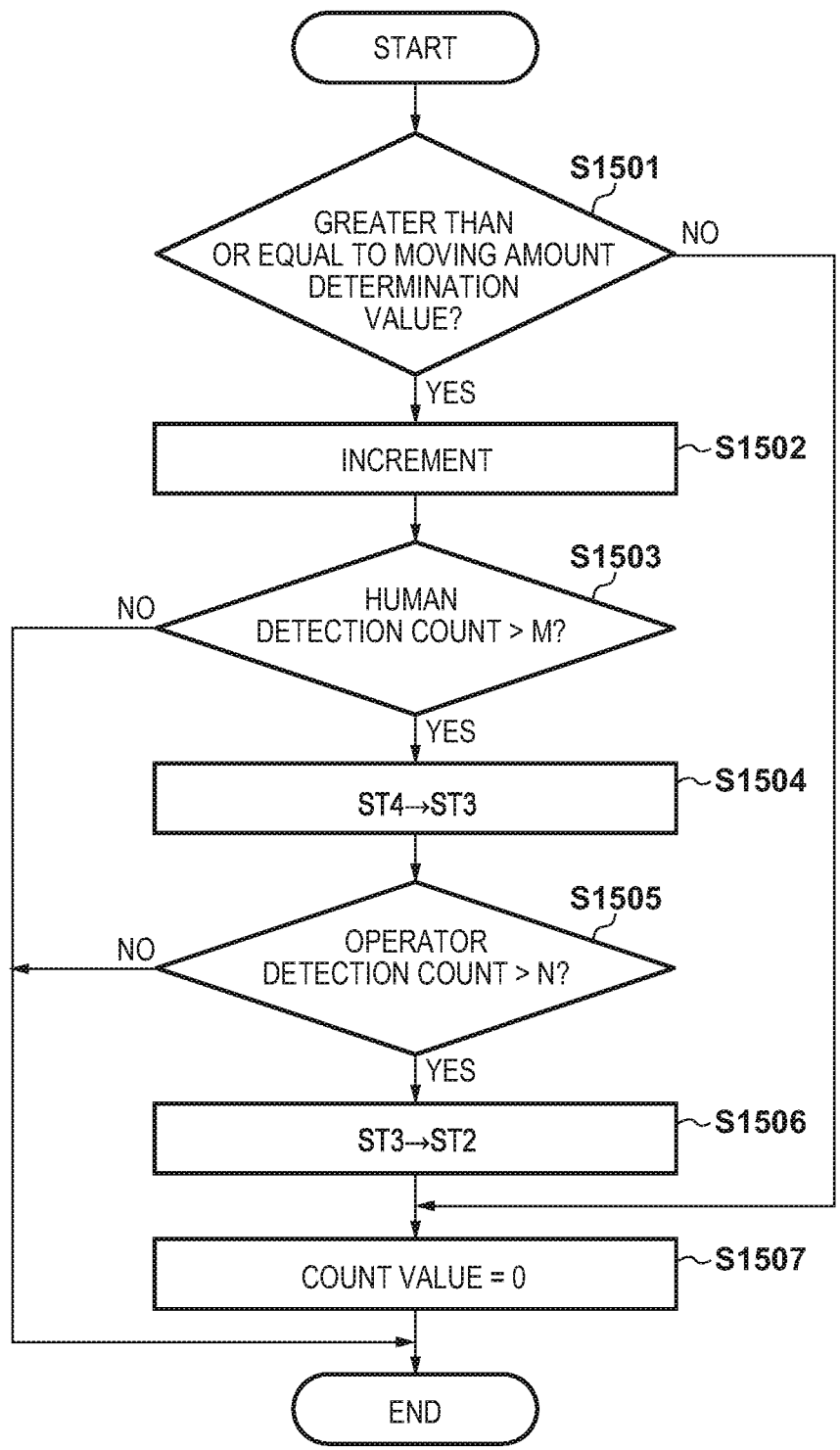
FIG. 15 is a flowchart pertaining to human detection using a moving amount determination value according to an embodiment.

Next, a processing sequence for counting in response to a human being detected by the microcomputer 203 of the console unit 12 will be described with reference to FIG. 15. The processes indicated in the flowchart of FIG. 15 are realized by the microcomputer 203 of the console unit 12 executing programs. The microcomputer 203 holds a value M (a first value) for detecting a human and a value N (a second value) for detecting an operator as threshold count values. The thresholds may be held in a memory or the like of the microcomputer 203, and furthermore, a counter variable for making the count may be provided as a flag.

First, in S1501, the microcomputer 203 determines whether or not the moving amount of the human is greater than or equal to the set moving amount determination value. If the moving amount is lower than the determination value, the process moves to S1507, where the microcomputer 203 sets the count variable to 0 and ends the processing. On the other hand, if the moving amount is greater than or equal to the determination value, the process moves to S1502, where the microcomputer 203 increments the counter variable. Here, "incrementing" means adding 1 to the counter variable.

Next, in S1503, the microcomputer 203 determines whether or not the value of the counter variable is greater than or equal to the threshold M for detecting a human. In the case where the value is greater than or equal to M, the process moves to S1504, whereas when such is not the case, the process ends. In S1504, the microcomputer 203 transitions the power mode from the power-saving state ST4 to the low-noise return state ST3. Next, in S1505, the microcomputer 203 determines whether or not the value of the counter variable is greater than or equal to the threshold N for detecting an operator. In the case where the value is greater than or equal to N, the process moves to S1506, whereas when such is not the case, the process ends. The microcomputer 203 transitions the power mode from the low-noise return state ST3 to the display unit return state ST2 in S1506, resets the counter variable to 0 in S1507, and ends the processing.

As described thus far, according to the present embodiment, the distance between the image forming apparatus and an object located in the periphery of the image forming apparatus is measured each predetermined amount of time. Then, whether or not the object is a human is detected on the basis of the measured distance and a moving amount of the object each predetermined amount of time. Furthermore, the image forming apparatus controls the power supply state of the image forming apparatus in accordance with the result of the human detection. In this manner, the image forming apparatus (information processing apparatus) according to the present embodiment sets the moving amount determination value for counting the human detections in accordance with the distance first measured for the object. The moving amount determination value is set to be high in places far from the image forming apparatus 100, and low in places close to the image forming apparatus 100. This is because when a human far from the image forming apparatus 100 is detected, a human intending to use the image forming apparatus 100 will be walking toward the image forming apparatus 100, and thus the human can be counted even if the moving amount determination value is set higher. On the other hand, if the moving amount determination value is set to be low for a human far from the image forming apparatus 100, the count number will increase and a problem in which the number of erroneous returns increases will arise. By employing the above-described configuration, the image forming apparatus according to the present embodiment can change the conditions for detecting that a human has approached the apparatus in accordance with the distance between the human and the apparatus, which makes it possible to reduce erroneous returns from the power-saving state caused by the erroneous detection of humans.

Figure 16:
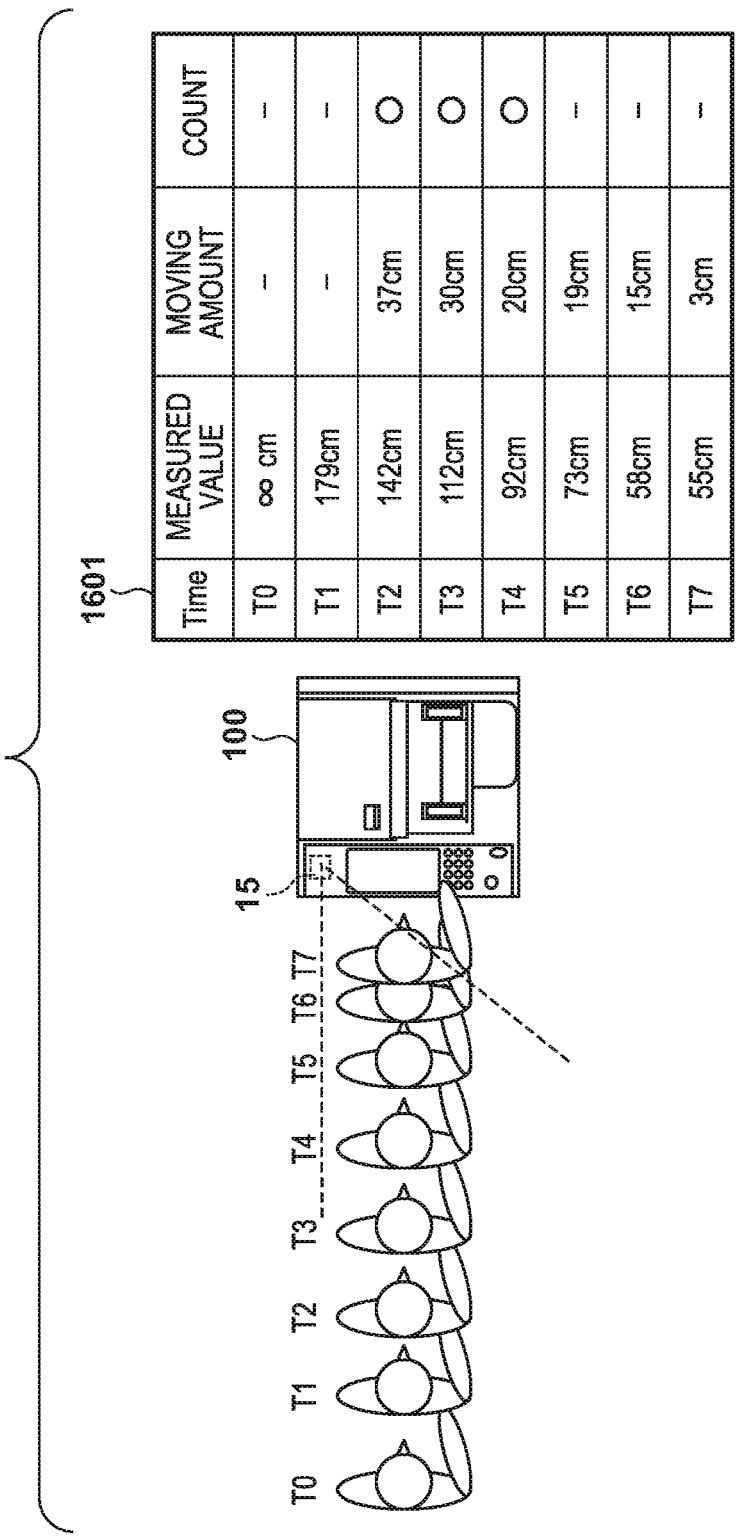
FIG. 16 is a diagram illustrating an example of a human approaching the image forming apparatus according to an embodiment.

Here, counting operations performed by the microcomputer 203 using a case in which a human actually approaches as an example will be described with reference to FIG. 16. T0 to T7 indicate the passage of time, with time progressing from T0 to T7. 1601 indicates the distance from an object measured at each of the times T0 to T7 (measurement values), along with moving amounts and whether or not counting operations are carried out. Note that the "moving amount" indicates a difference between the measured values from one time previous and the current time. For example, the moving amount at T2 is a value obtained by subtracting the measured value at T2 (142 cm) from the measured value at T1 (179 cm) (for a difference of 37 cm).

At time T0, no human is detected, and the measurement value is infinite. At time T1, 179 cm is measured. Because 179 cm is the distance that was first measured successfully, the moving amount determination value is set to 20 cm, as per FIG. 13. 179 cm is measured at T1 and 142 cm is measured at T2, and thus the T1-T2 moving amount is 37 cm. Because 37 cm is greater than 20 cm, a human is considered to have been detected, and thus a count is made. On the other hand, the T4-T5 moving amount is 19 cm, which is less than 20 cm, and thus a human is not successfully counted. In 1601, a count is made at T2, T3, and T4. Accordingly, in the example illustrated in FIG. 16, the count number is 3. As such, the image forming apparatus 100 determines that the detected object is a human, and transitions from the power-saving state ST4 to the low-noise return state ST3.

Figure 17:
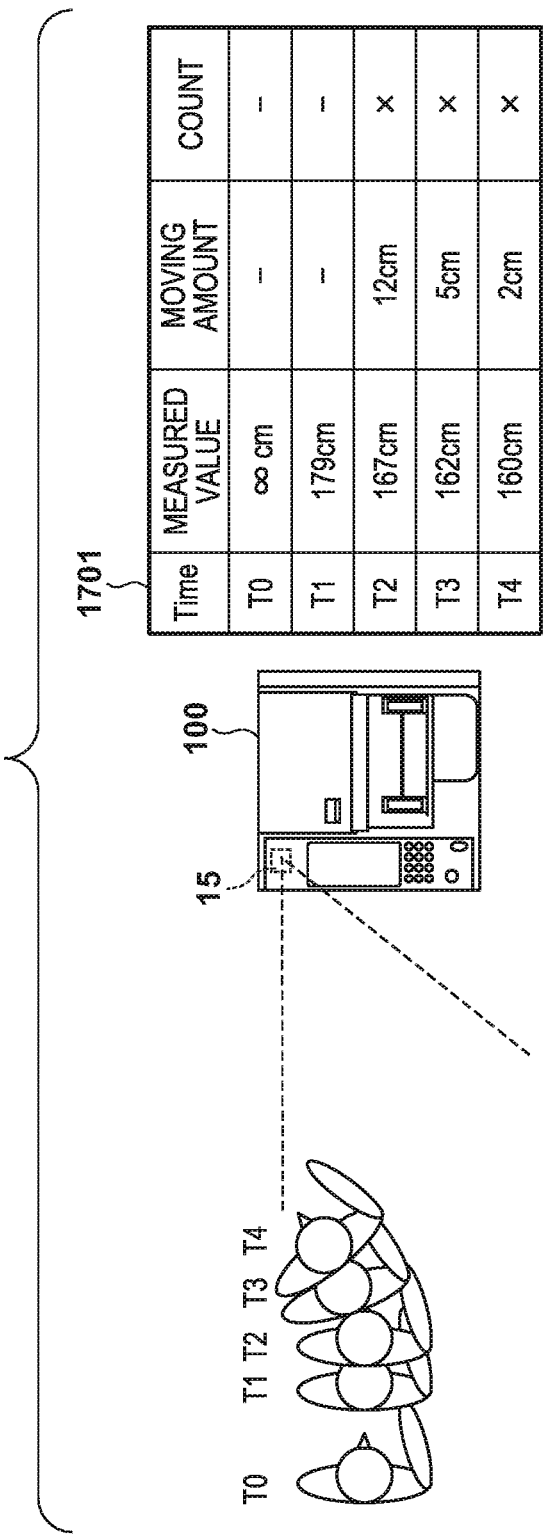
FIG. 17 is a diagram illustrating an example of a human approaching the image forming apparatus according to an embodiment.

Next, another case in which a human approaches the image forming apparatus 100 will be described with reference to FIG. 17. As indicated by 1701, the microcomputer 203 measures 179 cm at time T1, and thus the moving amount determination value is set to 20 cm. The moving amount of the human for T1-T2 is 12 cm, which is less than 20 cm. Thus a human is not considered to be detected, and a count is not made. Likewise, the moving amount is less than 20 cm for T2-T4. Thus a human is not considered to be detected, and a count is not made. Thus the count number is 0 in the example illustrated in FIG. 17. As such, the image forming apparatus 100 determines that the detected object (human) is a passing human, and maintains the power-saving state ST4.

Second Embodiment

Hereinafter, a second embodiment of the present invention will be described. In the foregoing embodiment, the moving amount determination value is set in accordance with the first distance to the object that is detected. However, in the present embodiment, control is carried out such that the moving amount determination value is changed each time in accordance with the distance measured in each amount of time. In other words, the processing indicated in the flowchart of FIG. 14 is executed each time the distance to the object is successfully measured.

Figure 18:
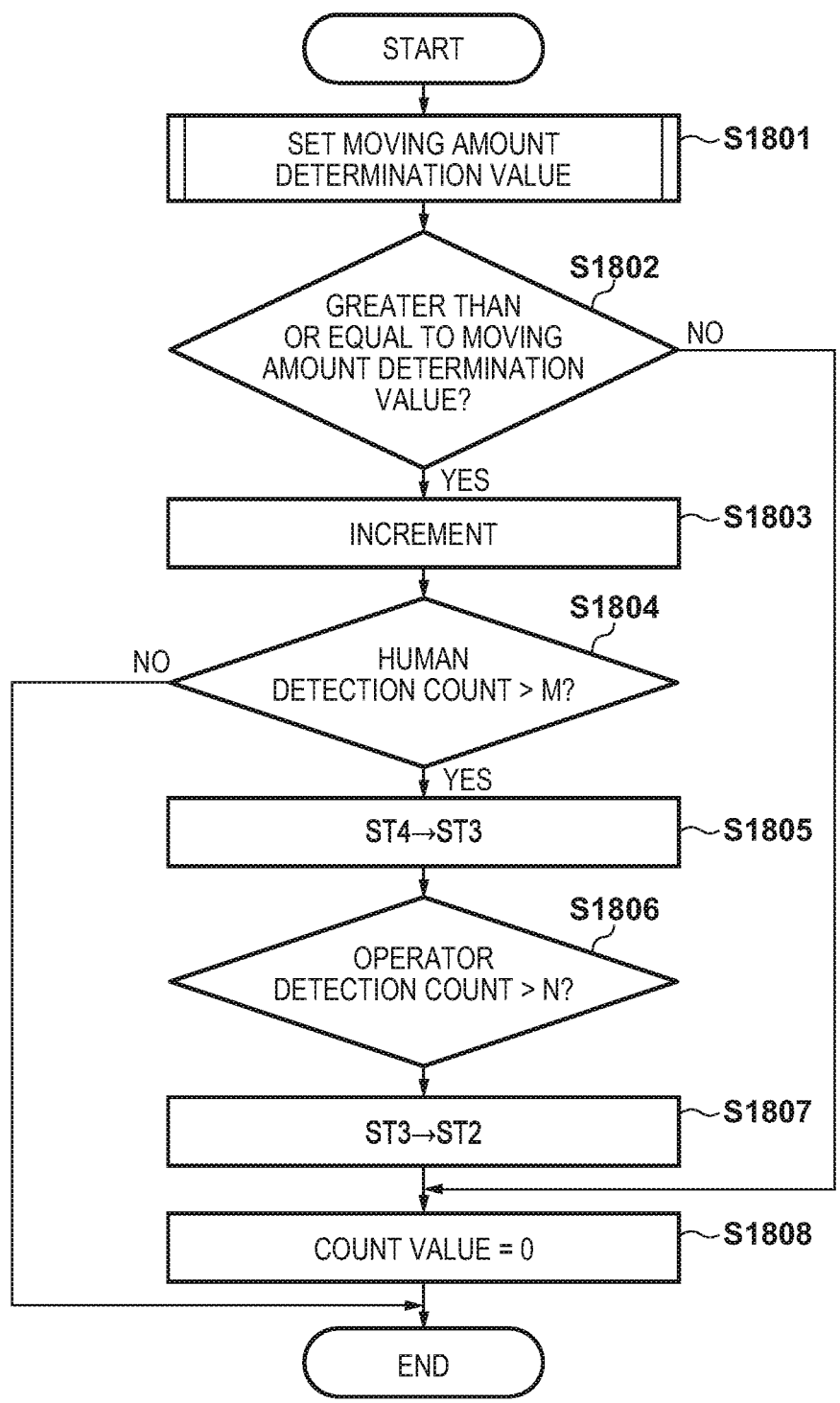
FIG. 18 is a flowchart illustrating the changing of a moving amount determination value in accordance with a change in sensitivity according to an embodiment.

A processing sequence for counting in response to a human being detected by the microcomputer 203 of the console unit 12 will be described with reference to FIG. 18. The processes indicated in the flowchart of FIG. 18 are realized by the microcomputer 203 of the console unit 12 executing programs. The microcomputer 203 holds the value M for detecting a human and the value N for detecting an operator as threshold count values. The thresholds may be held in a memory or the like of the microcomputer 203, and furthermore, a counter variable for making the count may be provided as a flag.

First, in S1801, the microcomputer 203 sets the moving amount determination value as indicated in FIG. 14. The subsequent processes from S1802 to S1808 are the same as the processes of S1501 to S1507 in FIG. 15, and thus descriptions thereof will be omitted. According to the present embodiment, the moving amount determination value is set each time in accordance with the distance between the image forming apparatus 100 and the human. Thus more detailed count-based determinations can be made, and the problem of erroneous returns and the like arising can be further reduced.

Third Embodiment

Hereinafter, a third embodiment of the present invention will be described. The present embodiment describes a method for changing a sensitivity of the human detection in accordance with a user input. Here, a case where the sensitivity for detecting a human has three levels, namely "low", "medium", and "high", will be described as an example.

Figures 19, 20:
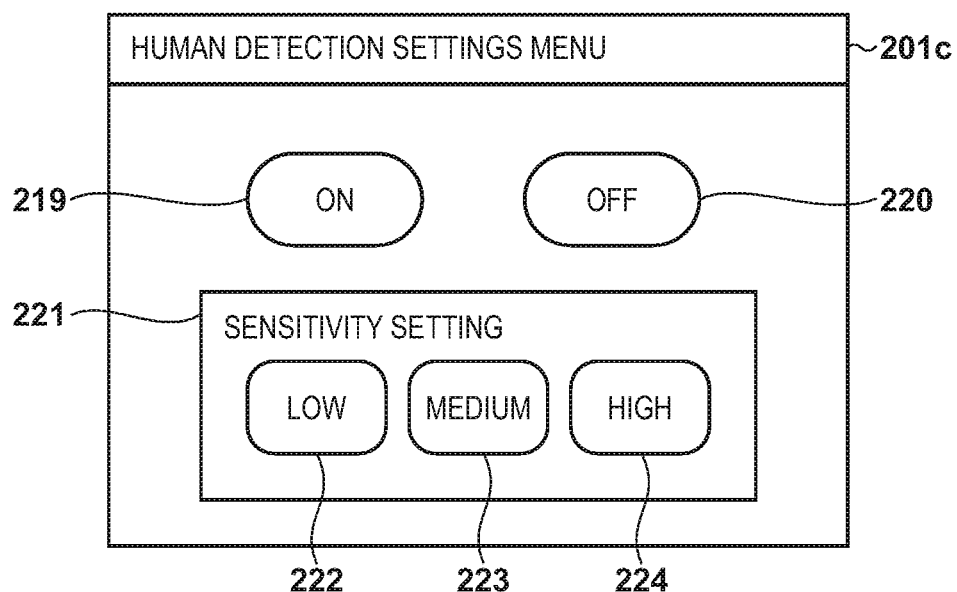
FIG. 19 is a diagram illustrating a display unit with respect to changing the sensitivity of human detection according to an embodiment.
FIG. 20 is a diagram illustrating parameters pertaining to changing the sensitivity of human detection according to an embodiment.

First, a human detection setting menu 201c displayed in the display unit 201 will be described with reference to FIG. 19. The human detection setting menu 201c includes a button 219 for turning human detection on, a button 220 for turning human detection off, and a human detection sensitivity setting menu 221. Buttons that enable sensitivities to be selected, namely low sensitivity 222, medium sensitivity 223, and high sensitivity 224, are displayed in the human detection sensitivity setting menu 221. The user can adjust the sensitivity of human detection by manipulating the buttons 222 to 224.

Next, parameters (a table) held by the microcomputer 203 in accordance with the sensitivities will be described with reference to FIG. 20. The moving amount determination value based on the distance is defined for each of sensitivities in a table 2000. In the example indicated by the table 2000, the moving amount determination value is set to 0 cm for all sensitivities when the distance is 0 to 60 cm. Comparing the moving amount determination values for the distance of 61 to 100 cm on the basis of the sensitivities, a value of 5 cm is used for low sensitivity, 3 cm is used for medium sensitivity, and 2 cm is used for high sensitivity. The values are thus defined such that as the sensitivity increases, even low amounts of human movement can be counted.

The table 2000 also defines the human detection threshold M and the operator detection threshold N, which are set as count values, for each of the sensitivities. The thresholds N and M are both set such that the count number is higher as the sensitivity decreases. This is a measure taken to reduce the erroneous detection of humans.

Figure 21:
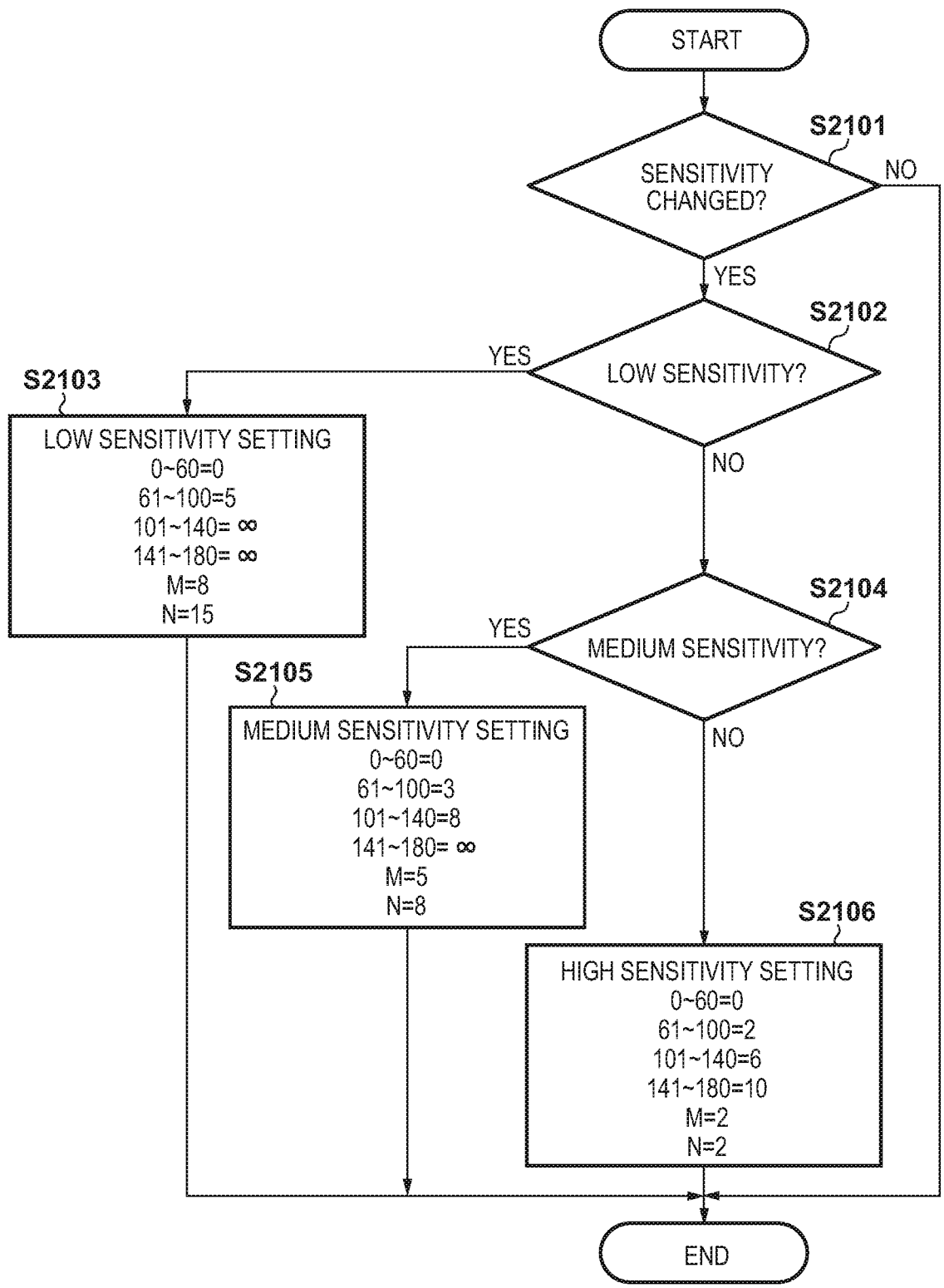
FIG. 21 is a flowchart illustrating the changing of a moving amount determination value in accordance with a change in sensitivity of human detection according to an embodiment.

Next, a processing sequence for changing the sensitivity will be described with reference to FIG. 21. The processes indicated in the flowchart of FIG. 21 are realized by the microcomputer 203 of the console unit 12 executing programs.

First, in S2101, the microcomputer 203 determines whether or not the sensitivity has been changed through the human detection setting menu 201c. In the case where the sensitivity has been changed, the process moves to S2102, whereas when such is not the case, the process ends. In S2102, the microcomputer 203 determines whether or not the set sensitivity is low sensitivity. In the case where the sensitivity is low sensitivity, the process moves to S2103, whereas when such is not the case, the process moves to S2104. In S2103, the microcomputer 203 determines that the sensitivity is low sensitivity, sets the value corresponding to the low sensitivity by referring to the table 2000, and ends the process.

Meanwhile, in S2104, the microcomputer 203 determines whether or not the set sensitivity is medium sensitivity. In the case where the sensitivity is medium sensitivity, the process moves to S2105, whereas when such is not the case, the process moves to S2106. In S2105, the microcomputer 203 sets the value corresponding to medium sensitivity by referring to the table 2000, and ends the process. Meanwhile, in S2106, the microcomputer 203 sets the value corresponding to high sensitivity by referring to the table 2000, and ends the process.

As described thus far, according to the present embodiment, the sensitivity of the human detection can be set to the user's desired sensitivity. As a result, the sensitivity of the human detection can be changed in accordance with the installation environment of the image forming apparatus 100 or the like, which makes it possible to further reduce erroneous returns caused by the erroneous detection of a human.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-150552 filed on Jul. 29, 2016, which is hereby incorporated by reference herein in its entirety.

What is claimed is:

1. An information processing apparatus comprising:
   a human sensor;
   an interface that inputs a setting related to a sensitivity of the human sensor; and
   a controller configured to,
   (1) in a case where a first setting related to the sensitivity of the human sensor is set, shift the information processing apparatus from a first power state to a second power state of which power consumption is larger than power consumption of the first power state if there is a human in a first area, and
   (2) in a case where a second setting related to the sensitivity of the human sensor is set, shift the information processing apparatus from the first power state to the second power state if there is a human in a second area which is farther from the information processing apparatus than the first area and a moving amount of the human in the second area toward the information processing apparatus is greater than a predetermined value,
   wherein in the case (1) where the first setting related to the sensitivity of the human sensor is set, the controller does not shift the information processing apparatus from the first power state to the second power state if there is a human in the second area and a moving amount of the human in the second area toward the information processing apparatus is greater than the predetermined value.

2. The information processing apparatus according to claim 1,
   wherein the controller shifts the information processing apparatus from the first power state to the second power state if there is a human in the first area and a moving amount of the human in the first area toward the information processing apparatus is greater than a second predetermined value being smaller than the first predetermined value in the case (1) where the first setting related to the sensitivity of the human sensor is set.

3. The information processing apparatus according to claim 1,
   wherein the controller shifts the information processing apparatus from the first power state to the second power state if there is a human in the first area in the case (2) where the second setting related to the sensitivity of the human sensor is set.

4. The information processing apparatus according to claim 3,
   wherein the controller shifts the information processing apparatus from the first power state to the second power state if there is a human in the first area and a moving amount of the human in the first area toward the information processing apparatus is greater than a third predetermined value being smaller than the first predetermined value.

5. The information processing apparatus according to claim 1, further comprising
   a display configured to display a screen for inputting a setting for the human sensor.

6. The information processing apparatus according to claim 5,
   wherein the screen is a screen for setting a sensitivity of the human sensor.

7. The information processing apparatus according to claim 1, wherein the human sensor is an ultrasonic sensor.

8. The information processing apparatus according to claim 1, further comprising a printer configured to print an image on a media.

9. The information processing apparatus according to claim 1, further comprising a scanner configured to scan an image on a document.

10. A method for shifting a power state of an information processing apparatus from a first power state to a second power state of which power consumption is larger than power consumption of the first power state, the method comprising:

inputting a setting related to a sensitivity of a human sensor;

(1) in a case where a first setting related to the sensitivity of the human sensor is set shifting the information processing apparatus from a first power state to a second power state of which power consumption is larger than power consumption of the first power state if there is a human in a first area; and (2) in a case where a second setting related to the sensitivity of the human sensor is set, shifting the information processing apparatus from the first power state to the second power state if there is a human in a second area which is farther from the information processing apparatus than the first area and a moving amount of the human in the second area toward the information processing apparatus is greater than a predetermined value, wherein the method further comprises, in the case (1) where the first setting related to the sensitivity of the human sensor is set, not shifting the information processing apparatus from the first power state to the second power state if there is a human in the second area and a moving amount of the human in the second area toward the information processing apparatus is greater than the predetermined value.

* * * * *